United States Patent
Li et al.

(10) Patent No.: US 11,284,316 B2
(45) Date of Patent: Mar. 22, 2022

(54) MOBILE DEVICE CENTRIC CLUSTERING IN WIRELESS SYSTEMS

(71) Applicant: QUALCOMM Incorporated, San Diego, CA (US)

(72) Inventors: Chong Li, Weehawken, NJ (US); Junyi Li, Chester, NJ (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 289 days.

(21) Appl. No.: 16/264,423

(22) Filed: Jan. 31, 2019

(65) Prior Publication Data

US 2019/0246321 A1    Aug. 8, 2019

Related U.S. Application Data

(60) Provisional application No. 62/627,445, filed on Feb. 7, 2018.

(51) Int. Cl.
| | |
|---|---|
| *H04B 7/024* | (2017.01) |
| *H04W 16/24* | (2009.01) |
| *H04W 24/10* | (2009.01) |
| *H04W 36/00* | (2009.01) |
| *H04B 17/309* | (2015.01) |
| *H04W 36/08* | (2009.01) |
| *H04L 5/00* | (2006.01) |

(Continued)

(52) U.S. Cl.
CPC ........ *H04W 36/0069* (2018.08); *H04B 7/022* (2013.01); *H04B 7/024* (2013.01); *H04B 7/0632* (2013.01); *H04B 17/309* (2015.01); *H04L 5/005* (2013.01); *H04W 36/08* (2013.01); *H04L 5/0035* (2013.01); *H04L 5/0094* (2013.01)

(58) Field of Classification Search
None
See application file for complete search history.

(56) References Cited

U.S. PATENT DOCUMENTS

| | | |
|---|---|---|
| 2012/0120842 A1 | 5/2012 | Kim et al. |
| 2013/0303167 A1 | 11/2013 | Zhu et al. |
| 2013/0343317 A1 | 12/2013 | Etemad et al. |

(Continued)

FOREIGN PATENT DOCUMENTS

EP    2733982 A1    5/2014

OTHER PUBLICATIONS

International Search Report and Written Opinion—PCT/US2019/016279—ISa/EPO—dated May 22, 2019 (181822WO).

(Continued)

*Primary Examiner* — Duc T Duong
(74) *Attorney, Agent, or Firm* — Holland & Hart LLP

(57) ABSTRACT

Methods, systems, and devices for wireless communications are described. A user equipment (UE) may identify a group of transmission reception points (TRPs) in a coordinated multi-point (CoMP) system. The UE may transmit information associated with measurements between the UE and a TRP of the group of TRPs. The UE may receive, based at least in part on transmitting the information associated with measurements between the UE and the TRP, an indication of resources for a first CoMP cluster of the CoMP system. The UE may communicate with the TRP via a resource pool of the TRP based at least in part on the indication of resources.

27 Claims, 22 Drawing Sheets

(51) Int. Cl.
    *H04B 7/06*         (2006.01)
    *H04B 7/022*      (2017.01)

(56) References Cited

U.S. PATENT DOCUMENTS

| | | | |
|---|---|---|---|
| 2014/0241323 A1 | 8/2014 | Park et al. | |
| 2015/0023278 A1 | 1/2015 | Boccardi et al. | |
| 2015/0327287 A1 | 11/2015 | Kim et al. | |
| 2017/0054477 A1 | 2/2017 | Natarajan et al. | |
| 2018/0139774 A1* | 5/2018 | Ma | H04W 72/1289 |
| 2019/0104551 A1* | 4/2019 | Deenoo | H04W 72/0453 |
| 2019/0223088 A1* | 7/2019 | Pateromichelakis | H04L 43/08 |
| 2019/0260527 A1* | 8/2019 | Wu | H04L 5/0053 |
| 2019/0319686 A1* | 10/2019 | Chen, IV | H04B 7/0639 |
| 2019/0327021 A1* | 10/2019 | Wang | H04L 1/0026 |
| 2019/0335495 A1* | 10/2019 | Yl | H04L 5/0007 |
| 2019/0380064 A1* | 12/2019 | Salem | H04W 74/0808 |
| 2020/0014514 A1* | 1/2020 | Gao | H04L 5/0048 |
| 2020/0059290 A1* | 2/2020 | Pan | H04B 7/0882 |
| 2020/0084776 A1* | 3/2020 | Zhang | H04W 72/044 |
| 2020/0119897 A1* | 4/2020 | Zhang | H04L 5/0005 |
| 2020/0259528 A1* | 8/2020 | Zhang | H04L 5/0057 |
| 2020/0305038 A1* | 9/2020 | Tooher | H04W 74/0833 |

OTHER PUBLICATIONS

Partial International Search Report—PCT/US2019/016279—ISA/EPO dated Apr. 9, 2019 (181822WO).

\* cited by examiner

MOBILE DEVICE CENTRIC CLUSTERING IN WIRELESS SYSTEMS

CROSS REFERENCE

The present Application for Patent claims the benefit of U.S. Provisional Patent Application No. 62/627,445 by LI et al., entitled "Mobile Device Centric Clustering in Wireless Systems," filed Feb. 7, 2018, assigned to the assignee hereof, and expressly incorporated by reference in its entirety herein.

BACKGROUND

The following relates generally to wireless communications, and more specifically to mobile device centric clustering in wireless systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

One technique for mitigating inter cell interference (ICI) in wireless communications systems may be through the use of coordinated multipoint (CoMP) communications. In a CoMP system, various base stations within the system coordinate between one another the transmission and reception of communications between the base stations and the UEs of the system. The base stations may dynamically coordinate to provide joint scheduling and transmissions as well as joint processing of the received signals. In this way, a UE of a cell is able to be served by two or more eNBs to improve transmission and reception signals and increase throughput, particularly under cell edge conditions.

Some CoMP systems may experience latency or other communication issues. For example, utilizing CoMP may provide capacity enhancement for frequency reuse techniques. Coherent joint transmission (e.g., beamforming, nulling transmissions) may rely on phase alignment in some CoMP systems, where average signal-to-noise-plus-interference ratio may be an indicator of system performance. The systems may rely on indicators of outage capacity, such as reliability within latency constraints. More efficient techniques for use in a CoMP system that accounts for the performance demands of varying operating conditions are desired.

SUMMARY

The described techniques relate to improved methods, systems, devices, or apparatuses that support mobile device centric clustering. A user equipment (UE) within a coordinated multipoint (CoMP) system may identify a group of transmission reception points (TRPs) within the system and transmit information associated with measurements between the UE and one of the TRPs of a TRP group. In some cases, the transmitted information may be a reference signal, which may be used by the TRP to measure conditions on a channel for communicating with the UE. Alternatively, the transmitted information may be channel condition measurements (e.g., a measurement report) which the UE performed based on broadcast or other reference signals received from one or more TRPs of the group of TRPs.

Based on the transmitted information, the base station, TRP, or a separate coordinating entity or device may select a set of TRPs to form a cluster that is centric to the UE. The formation of the cluster may be dynamic such that a UE experiencing variations in channel conditions may be capable of communicating with different TRPs, such as those having higher signal quality. TRPs in a given cluster may communicate with the UE over dedicated resources of a resource pool, and TRPs may be added or removed dynamically from a cluster (e.g., as a UE moves and/or experiences different channel conditions).

In some examples, a CoMP system may include a set of static clusters each of which may be operated by one or more TRPs and capable of supporting communication with multiple UEs. A UE may operate initially within one of the static clusters. The channel conditions in the static cluster may change, such as if the UE moves out of range of the cluster or if the UE experiences interference. These changes in the channel conditions may be reported to a coordinating entity (e.g., a core network node, one or more TRPs) through periodic or aperiodic reporting. The coordinating entity may determine a new static cluster for the UE (e.g., based on measurement reports from a UE, based on a request message from the UE, based on other information associated with the UE), and may inform the TRPs of the new cluster assignment. The coordinating entity may, in some examples, also inform the UE of the new assignment. Thus, a UE may transition from one cluster (e.g., a first static cluster) to another cluster (e.g., a second static cluster, a dynamic cluster) based on channel conditions.

In some examples, a CoMP system may implement a hybrid cluster formation. A UE may operate initially within one static cluster. The channel conditions in the static cluster may change, such as if the UE moves out of range of the cluster, or if the UE experiences interference, among other examples. These changes in the channel conditions may be reported to the coordinating entity through periodic or aperiodic reporting. The coordinating entity may determine a new dynamic cluster for the UE based on the changed channel conditions and may inform the TRPs regarding the new dynamic cluster assignment. In some cases, the TRPs selected for the dynamic cluster may remain within their previously assigned static cluster or clusters. Alternatively, the selected TRPs may leave the static cluster or clusters. The coordinating entity may also inform the UE of the new assignment. In some cases, the coordinating entity may form and remove clusters in the CoMP system based on UE requests for a new cluster. For example, if the coordinating entity receives one or more requests directly or indirectly from a UE (or from multiple UEs) to create a dynamic cluster, the coordinating entity may form a dynamic cluster based on these requests. Similarly, the coordinating entity may remove clusters based on one or more parameters, such as a lack of UE requests for a specific cluster or a small number of UEs using a specific cluster.

A method of wireless communications is described. The method may include identifying a group of TRPs in a coordinated wireless system, transmitting information associated with measurements between a UE and a TRP of the group of TRPs, receiving, based at least in part on transmitting the information associated with measurements between the UE and the TRP, an indication of resources for a first coordinate cluster of the coordinated wireless system, and communicating with the TRP via a resource pool of the TRP based at least in part on the indication of resources.

An apparatus for wireless communications is described. The apparatus may include means for identifying a group of TRPs in a coordinated wireless system, means for transmitting information associated with measurements between a UE and a TRP of the group of TRPs, means for receiving, based at least in part on transmitting the information associated with measurements between the UE and the TRP, an indication of resources for a first coordinate cluster of the coordinated wireless system, and means for communicating with the TRP via a resource pool of the TRP based at least in part on the indication of resources.

Another apparatus for wireless communications is described. The apparatus may include a processor, memory in electronic communication with the processor, and instructions stored in the memory. The instructions may be operable to cause the processor to identify a group of TRPs in a coordinated wireless system, transmit information associated with measurements between a UE and a TRP of the group of TRPs, receive, based at least in part on transmitting the information associated with measurements between the UE and the TRP, an indication of resources for a first coordinate cluster of the coordinated wireless system, and communicate with the TRP via a resource pool of the TRP based at least in part on the indication of resources.

A non-transitory computer-readable medium for wireless communications is described. The non-transitory computer-readable medium may include instructions operable to cause a processor to identify a group of TRPs in a coordinated wireless system, transmit information associated with measurements between a UE and a TRP of the group of TRPs, receive, based at least in part on transmitting the information associated with measurements between the UE and the TRP, an indication of resources for a first coordinate cluster of the coordinated wireless system, and communicate with the TRP via a resource pool of the TRP based at least in part on the indication of resources.

In some examples of the method, apparatus, and non-transitory computer-readable medium described above, transmitting information associated with measurements between the UE and the TRP may include transmitting a reference signal on dedicated resources for each resource pool associated with the group of TRPs.

Some examples of the method, apparatus, and non-transitory computer-readable medium described above may further include processes, features, means, or instructions for receiving a downlink message via dedicated resources for the resource pool of the TRP based at least in part on the transmitted reference signal.

In some examples of the method, apparatus, and non-transitory computer-readable medium described above, the downlink message may be received from the TRP or a core network node.

Some examples of the method, apparatus, and non-transitory computer-readable medium described above may further include processes, features, means, or instructions for receiving a downlink message via dedicated resources for a second resource pool of a second TRP of the group of TRPs based at least in part on the transmitted reference signal. Some examples of the method, apparatus, and non-transitory computer-readable medium described above may further include processes, features, means, or instructions for communicating with the second TRP via the second resource pool.

In some examples of the method, apparatus, and non-transitory computer-readable medium described above, the resource pool and the second resource pool may be the same.

In some examples of the method, apparatus, and non-transitory computer-readable medium described above, transmitting the reference signal on dedicated resources may include transmitting the reference signal to the TRP.

Some examples of the method, apparatus, and non-transitory computer-readable medium described above may further include processes, features, means, or instructions for receiving, based at least in part on transmitting the information associated with measurements between the UE and the TRP, an indication of one or more TRP identifiers (IDs) for TRPs of the first coordinated cluster, where communication with the TRP may be based at least in part on the indication of one or more TRP IDs.

Some examples of the method, apparatus, and non-transitory computer-readable medium described above may further include processes, features, means, or instructions for receiving a broadcast signal from the TRP. Some examples of the method, apparatus, and non-transitory computer-readable medium described above may further include processes, features, means, or instructions for measuring a signal quality parameter of the broadcast signal, where the information associated with measurements between the UE and the TRP include a measurement report that includes the signal quality parameter.

Some examples of the method, apparatus, and non-transitory computer-readable medium described above may further include processes, features, means, or instructions for receiving a downlink message via dedicated resources for the resource pool of the TRP based at least in part on the measurement report.

In some examples of the method, apparatus, and non-transitory computer-readable medium described above, the downlink message may be received from the TRP or a core network node.

Some examples of the method, apparatus, and non-transitory computer-readable medium described above may further include processes, features, means, or instructions for receiving a downlink message via dedicated resources for a second resource pool of a second TRP of the group of TRPs based at least in part on the measurement report. Some examples of the method, apparatus, and non-transitory computer-readable medium described above may further include processes, features, means, or instructions for communicating with the second TRP via the second resource pool.

In some examples of the method, apparatus, and non-transitory computer-readable medium described above, the resource pool and the second resource pool may be the same.

In some examples of the method, apparatus, and non-transitory computer-readable medium described above, the measurement report may be transmitted to multiple TRPs including the TRP or a core network node in communication with multiple TRPs including the TRP.

In some examples of the method, apparatus, and non-transitory computer-readable medium described above, communicating with the TRP may include monitoring a set of control channel resources associated with the resource pool of the TRP based at least in part on the indication of resources.

Some examples of the method, apparatus, and non-transitory computer-readable medium described above may further include processes, features, means, or instructions for decoding at least one control channel message from the TRP based at least in part on the monitoring.

Some examples of the method, apparatus, and non-transitory computer-readable medium described above may further include processes, features, means, or instructions for performing handover from the first coordinated cluster to a second coordinated cluster based at least in part on measurements between the UE and an additional TRP of the group of TRPs, where the second coordinated cluster may include the TRP and the additional TRP.

Some examples of the method, apparatus, and non-transitory computer-readable medium described above may further include processes, features, means, or instructions for performing handover from the first coordinated cluster to a second coordinated cluster based at least in part on measurements between the UE and an additional TRP of the group of TRPs, where the second coordinated cluster may include the additional TRP and excludes the TRP.

A method of wireless communications is described. The method may include receiving, from a UE, information associated with measurements between the UE and a TRP of a group of TRPs in a coordinated wireless system, transmitting, to the UE based at least in part on the information associated with measurements between the UE and the TRP, an indication of resources for a first coordinated cluster of the coordinated wireless system, where the first coordinated cluster is associated with the TRP, and communicating with the UE via a resource pool of the TRP based at least in part on the indication of resources for the first coordinated cluster.

An apparatus for wireless communications is described. The apparatus may include means for receiving, from a UE, information associated with measurements between the UE and a TRP of a group of TRPs in a coordinated wireless system, means for transmitting, to the UE based at least in part on the information associated with measurements between the UE and the TRP, an indication of resources for a first coordinated cluster of the coordinated wireless system, where the first coordinated cluster is associated with the TRP, and means for communicating with the UE via a resource pool of the TRP based at least in part on the indication of resources for the first coordinated cluster.

Another apparatus for wireless communications is described. The apparatus may include a processor, memory in electronic communication with the processor, and instructions stored in the memory. The instructions may be operable to cause the processor to receive, from a UE, information associated with measurements between the UE and a TRP of a group of TRPs in a coordinated wireless system, transmit, to the UE based at least in part on the information associated with measurements between the UE and the TRP, an indication of resources for a first coordinated cluster of the coordinated wireless system, where the first coordinated cluster is associated with the TRP, and communicate with the UE via a resource pool of the TRP based at least in part on the indication of resources for the first coordinated cluster.

A non-transitory computer-readable medium for wireless communications is described. The non-transitory computer-readable medium may include instructions operable to cause a processor to receive, from a UE, information associated with measurements between the UE and a TRP of a group of TRPs in a coordinated wireless system, transmit, to the UE based at least in part on the information associated with measurements between the UE and the TRP, an indication of resources for a first coordinated cluster of the coordinated wireless system, where the first coordinated cluster is associated with the TRP, and communicate with the UE via a resource pool of the TRP based at least in part on the indication of resources for the first coordinated cluster.

Some examples of the method, apparatus, and non-transitory computer-readable medium described above may further include processes, features, means, or instructions for receiving, from a core network node, a backhaul message that indicates resources for the first coordinated cluster.

In some examples of the method, apparatus, and non-transitory computer-readable medium described above, transmitting the indication of resources may include transmitting, to the UE, a downlink message via dedicated resources for the resource pool of the TRP.

In some examples of the method, apparatus, and non-transitory computer-readable medium described above, receiving information associated with measurements between the UE and the TRP may include receiving, from the UE, a reference signal for measurement by the TRP.

Some examples of the method, apparatus, and non-transitory computer-readable medium described above may further include processes, features, means, or instructions for measuring a signal quality parameter of the reference signal received from the UE. Some examples of the method, apparatus, and non-transitory computer-readable medium described above may further include processes, features, means, or instructions for transmitting, to a core network node, a measurement report that may include the signal quality parameter. Some examples of the method, apparatus, and non-transitory computer-readable medium described above may further include processes, features, means, or instructions for receiving, from the core network node, a backhaul message that indicates resources for the first coordinated cluster based at least in part on the measurement report.

Some examples of the method, apparatus, and non-transitory computer-readable medium described above may further include processes, features, means, or instructions for transmitting a broadcast signal to the UE, where the information associated with measurements between the UE and the TRP may include a measurement report based at least in part on the broadcast signal.

Some examples of the method, apparatus, and non-transitory computer-readable medium described above may further include processes, features, means, or instructions for transmitting the measurement report to a core network node. Some examples of the method, apparatus, and non-transitory computer-readable medium described above may further include processes, features, means, or instructions for receiving, from the core network node, a backhaul message that indicates resources for the first coordinated cluster based at least in part on the measurement report.

A method of wireless communications is described. The method may include identifying a set of coordinated clusters in a coordinated wireless system that may include a group of TRPs, where each coordinated cluster is associated with a subset of the group of TRPs, determining that a set of channel statistics for each coordinated cluster of the set of coordinated clusters is below a threshold, and transmitting, to at least one TRP of the group of TRPs, a request to form an additional coordinated cluster based at least in part on the determination.

An apparatus for wireless communications is described. The apparatus may include means for identifying a set of coordinated clusters in a coordinated wireless system that may include a group of TRPs, where each coordinated cluster is associated with a subset of the group of TRPs, means for determining that a set of channel statistics for each coordinated cluster of the set of coordinated clusters is below a threshold, and means for transmitting, to at least one TRP of the group of TRPs, a request to form an additional coordinated cluster based at least in part on the determination.

Another apparatus for wireless communications is described. The apparatus may include a processor, memory in electronic communication with the processor, and instructions stored in the memory. The instructions may be operable to cause the processor to identify a set of coordinated clusters in a coordinated wireless system that may include a group of TRPs, where each coordinated cluster is associated with a subset of the group of TRPs, determine that a set of channel statistics for each coordinated cluster of the set of coordinated clusters is below a threshold, and transmit, to at least one TRP of the group of TRPs, a request to form an additional coordinated cluster based at least in part on the determination.

A non-transitory computer-readable medium for wireless communications is described. The non-transitory computer-readable medium may include instructions operable to cause a processor to identify a set of coordinated clusters in a coordinated wireless system that may include a group of TRPs, where each coordinated cluster is associated with a subset of the group of TRPs, determine that a set of channel statistics for each coordinated cluster of the set of coordinated clusters is below a threshold, and transmit, to at least one TRP of the group of TRPs, a request to form an additional coordinated cluster based at least in part on the determination.

Some examples of the method, apparatus, and non-transitory computer-readable medium described above may further include processes, features, means, or instructions for receiving an indication that the additional coordinated cluster may have been formed based at least in part on the request, where the additional coordinated cluster may be associated with multiple TRPs of the group of TRPs.

Some examples of the method, apparatus, and non-transitory computer-readable medium described above may further include processes, features, means, or instructions for performing channel statistic measurements for one or more clusters of the set of coordinated clusters, where the set of channel statistics for each coordinated cluster of the set of coordinated clusters may be determined to be below the threshold based at least in part on the channel statistic measurements.

Some examples of the method, apparatus, and non-transitory computer-readable medium described above may further include processes, features, means, or instructions for performing handover from a first coordinated cluster of the set of coordinated clusters to the additional coordinated cluster based at least in part on the request to form the additional coordinated cluster.

Some examples of the method, apparatus, and non-transitory computer-readable medium described above may further include processes, features, means, or instructions for measuring channel statistics for a first coordinated cluster of the set of coordinated clusters. Some examples of the method, apparatus, and non-transitory computer-readable medium described above may further include processes, features, means, or instructions for performing handover from the additional coordinated cluster to the first coordinated cluster based at least in part on the measured channel statistics.

A method of wireless communications is described. The method may include identifying a set of coordinated clusters in a coordinated wireless system that may include a group of TRPs, where each coordinated cluster is associated with a subset of the group of TRPs and receiving, from a UE, a request to form an additional coordinated cluster based at least in part on measurements between the UE and one or more TRPs of the group of TRPs.

An apparatus for wireless communications is described. The apparatus may include means for identifying a set of coordinated clusters in a coordinated wireless system that may include a group of TRPs, where each coordinated cluster is associated with a subset of the group of TRPs and means for receiving, from a UE, a request to form an additional coordinated cluster based at least in part on measurements between the UE and one or more TRPs of the group of TRPs.

Another apparatus for wireless communications is described. The apparatus may include a processor, memory in electronic communication with the processor, and instructions stored in the memory. The instructions may be operable to cause the processor to identify a set of coordinated clusters in a coordinated wireless system that may include a group of TRPs, where each coordinated cluster is associated with a subset of the group of TRPs and receive, from a UE, a request to form an additional coordinated cluster based at least in part on measurements between the UE and one or more TRPs of the group of TRPs.

A non-transitory computer-readable medium for wireless communications is described. The non-transitory computer-readable medium may include instructions operable to cause a processor to identify a set of coordinated clusters in a coordinated wireless system that may include a group of TRPs, where each coordinated cluster is associated with a subset of the group of TRPs and receive, from a UE, a request to form an additional coordinated cluster based at least in part on measurements between the UE and one or more TRPs of the group of TRPs.

Some examples of the method, apparatus, and non-transitory computer-readable medium described above may further include processes, features, means, or instructions for transmitting, to a core network node, the request to form the additional coordinated cluster. Some examples of the method, apparatus, and non-transitory computer-readable medium described above may further include processes, features, means, or instructions for receiving, from the core network node, an indication that the additional coordinated cluster may have been formed based at least in part on the request. Some examples of the method, apparatus, and non-transitory computer-readable medium described above may further include processes, features, means, or instructions for transmitting, to the UE, the indication that the additional coordinated cluster may have been formed.

Some examples of the method, apparatus, and non-transitory computer-readable medium described above may further include processes, features, means, or instructions for receiving, from the UE, a handover request to perform handover from the additional coordinated cluster to a first coordinated cluster of the group of TRPs.

Some examples of the method, apparatus, and non-transitory computer-readable medium described above may further include processes, features, means, or instructions for receiving, from the UE, a handover request to perform handover from a first coordinated cluster of the group of TRPs to the additional coordinated cluster.

Some examples of the method, apparatus, and non-transitory computer-readable medium described above may further include processes, features, means, or instructions for receiving, from a second UE, a join request to join a cluster of the coordinated system. Some examples of the method, apparatus, and non-transitory computer-readable medium described above may further include processes, features, means, or instructions for transmitting, to the second UE, an indication to join the additional coordinated cluster.

A method of wireless communications is described. The method may include identifying a group of TRPs accessible by a UE in a coordinated wireless system, receiving information associated with signal measurements between the UE and the group of TRPs, dynamically selecting a coordinated cluster of TRPs from the group of TRPs for communication with the UE based at least in part on the signal measurements, and communicating with the UE via one or more of the TRPs from the coordinated cluster of TRPs.

An apparatus for wireless communications is described. The apparatus may include means for identifying a group of TRPs accessible by a UE in a coordinated wireless system, means for receiving information associated with signal measurements between the UE and the group of TRPs, means for dynamically selecting a coordinated cluster of TRPs from the group of TRPs for communication with the UE based at least in part on the signal measurements, and means for communicating with the UE via one or more of the TRPs from the coordinated cluster of TRPs.

Another apparatus for wireless communications is described. The apparatus may include a processor, memory in electronic communication with the processor, and instructions stored in the memory. The instructions may be operable to cause the processor to identify a group of TRPs accessible by a UE in a coordinated wireless system, receive information associated with signal measurements between the UE and the group of TRPs, dynamically select a coordinated cluster of TRPs from the group of TRPs for communication with the UE based at least in part on the signal measurements, and communicate with the UE via one or more of the TRPs from the coordinated cluster of TRPs.

A non-transitory computer-readable medium for wireless communications is described. The non-transitory computer-readable medium may include instructions operable to cause a processor to identify a group of TRPs accessible by a UE in a coordinated wireless system, receive information associated with signal measurements between the UE and the group of TRPs, dynamically select a coordinated cluster of TRPs from the group of TRPs for communication with the UE based at least in part on the signal measurements, and communicate with the UE via one or more of the TRPs from the coordinated cluster of TRPs.

Some examples of the method, apparatus, and non-transitory computer-readable medium described above may further include processes, features, means, or instructions for receiving additional information associated with signal measurements between the UE and the group of TRPs. Some examples of the method, apparatus, and non-transitory computer-readable medium described above may further include processes, features, means, or instructions for dynamically selecting a second coordinated cluster of TRPs from the group of TRPs for communication with the UE based at least in part on the signal measurements, where the second coordinated cluster may include at least one TRP different from TRPs of the coordinated cluster. Some examples of the method, apparatus, and non-transitory computer-readable medium described above may further include processes, features, means, or instructions for communicating with the UE via one or more of the TRPs from the second coordinated cluster of TRPs.

Some examples of the method, apparatus, and non-transitory computer-readable medium described above may further include processes, features, means, or instructions for receiving additional information associated with signal measurements between a second UE and the group of TRPs. Some examples of the method, apparatus, and non-transitory computer-readable medium described above may further include processes, features, means, or instructions for dynamically selecting the coordinated cluster of TRPs from the group of TRPs for communication with the second UE based at least in part on the signal measurements. Some examples of the method, apparatus, and non-transitory computer-readable medium described above may further include processes, features, means, or instructions for communicating with the second UE via one or more of the TRPs from the coordinated cluster of TRPs.

In some examples of the method, apparatus, and non-transitory computer-readable medium described above, the coordinated cluster of TRPs may be dynamically selected based at least in part on preferences associated with the UE, preferences associated with at least one other UE, environmental conditions, capabilities of the UE or a second UE in communication with the coordinated cluster, or a combination thereof.

Some examples of the method, apparatus, and non-transitory computer-readable medium described above may further include processes, features, means, or instructions for receiving additional information associated with signal measurements between the UE and the group of TRPs. Some examples of the method, apparatus, and non-transitory computer-readable medium described above may further include processes, features, means, or instructions for modifying a set of TRPs of the coordinated cluster based at least in part on the additional information.

In some examples of the method, apparatus, and non-transitory computer-readable medium described above, modifying the set of TRPs may include adding at least one additional TRP, removing a TRP of the set of TRPs, or a combination thereof.

DETAILED DESCRIPTION

Figure 1:
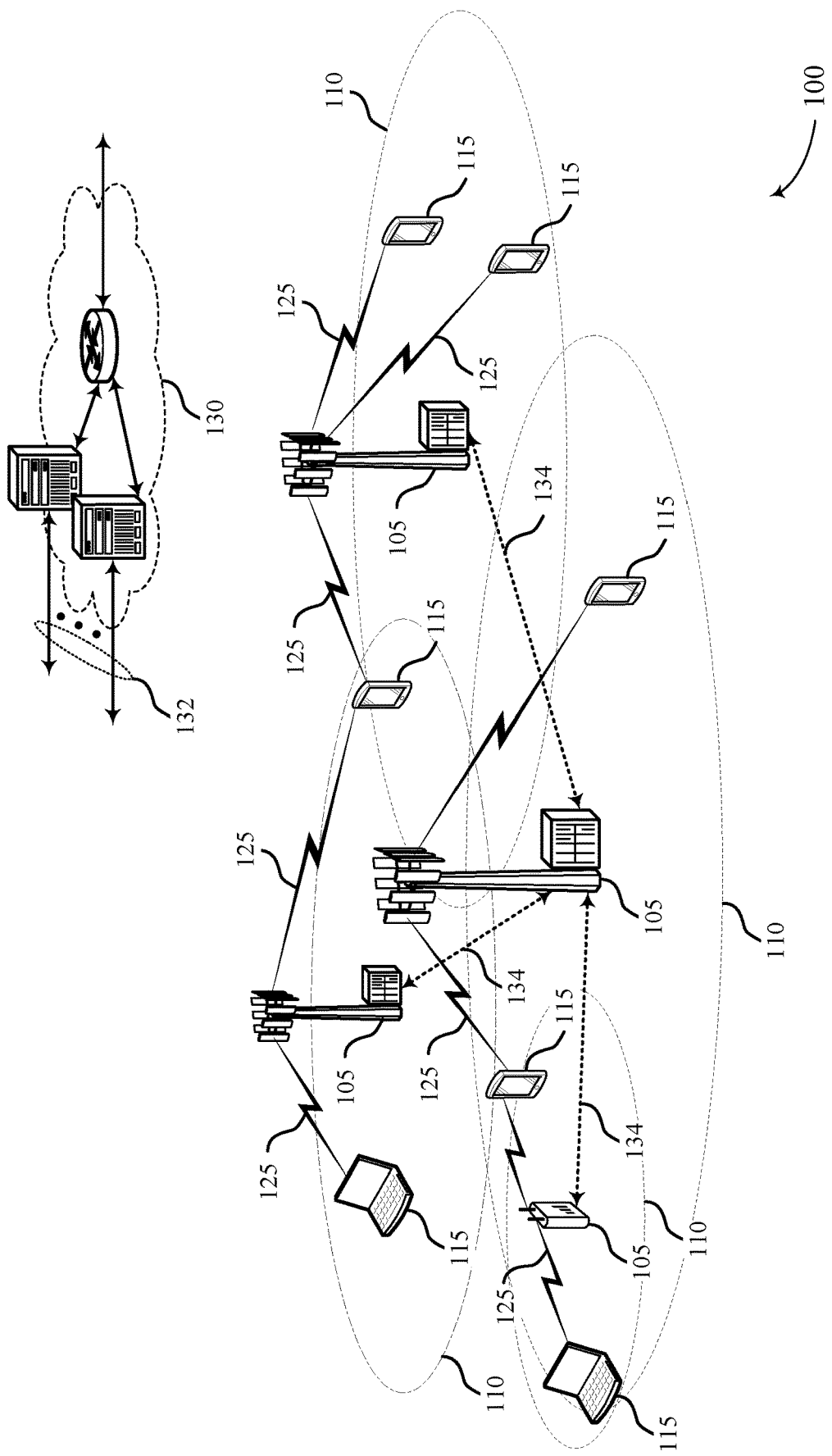
FIG. 1 illustrates an example of a system for wireless communications that supports mobile device centric clustering in wireless systems in accordance with aspects of the present disclosure.

Some wireless communications systems, such as those that implement ultra-reliable low latency communications (URLLC), may allow for increased data rates and higher throughput for wireless communications. Some of these systems may provide for a high reliability rate (e.g., 10e-6 error rate) within a 1-10 millisecond (ms) cycle time, such as in an Internet of Things (IoT) system. User equipment (UEs) within an IoT setting may communicate periodic traffic within deterministic synchronous cycles. These UEs may transmit and receive small payloads, which may allow for a large number of UEs to operate within the IoT system. Backhaul links, such as those between different transmission/reception points (TRPs) in the IoT system, may be fast, reliable, and deterministic (e.g., Time-Sensitive Networking (TSN) and/or Integrated Access and Backhaul (IAB)), allowing for communications between TRPs to have high throughput and data rates. Further, the UEs may have mitigated path loss (e.g., providing communications with a low path loss exponent) due to a waveguide effect.

UEs operating in the IoT system, however, may also be limited to a short communication range and may face challenging propagation scenarios due to the nature of the operating environment. For example, in an industrial IoT (IIoT) system, there may be fast moving parts, machines, or devices within a particular operating environment. As such, UEs may operate based on fast shadowing communication techniques due to communication blocking by these moving parts. UEs may experience interference from far-away transmissions, which may be rapidly varying due to reflection within the industrial environment. Additionally, the mobility of the UEs may be limited in terms of speed, range, and randomness.

Due to the difficult environment that some UEs operate within, spatial reuse may be utilized for URLLC communications. Spatial reuse, however, may require coordinated communications between various TRPs (e.g., in a CoMP system) to ensure that spatial reuse efforts may not inadvertently increase inter cell interference (ICI).

The described techniques relate to the formation of UE-centric clusters in a coordinated multipoint (CoMP) system. By leveraging the communication links in an IIoT system (e.g., backhaul communication links), one or more UEs in the CoMP system may be within a coverage area supported by multiple TRPs, that may be centric to the UE (or at least one other UE). Some clusters may overlap and in such instances, different frequencies may be utilized to help mitigate interference between different clusters. Each cluster may support communication for a UE via multiple TRPs and a single TRP may be part of multiple clusters. To support communications over different clusters, a TRP may be configured to communicate using resources specified for each cluster. The TRP may, in some examples, be an independent base station or a group of TRPs may be controlled by a single base station or coordinating entity (e.g., a grand master).

In some cases, when a UE moves within a CoMP system, the UE may perform measurements of broadcast signals transmitted by various TRPs within the CoMP system. Additionally or alternatively, the UE may transmit reference signals which may be received and measured by one or more TRPs. Based on the measurements of the broadcast signals or the measurements of the reference signals, a coordinating entity may assign a set of TRPs to communicate with a UE in a UE-centric cluster. As the UE moves, additional measurements may be performed and TRPs may be added to or removed from the UE-centric cluster.

A UE within a cluster (e.g., a UE-centric cluster, a static cluster) of the CoMP system may experience changes in channel conditions and when signal quality associated with one or more TRPs of the cluster falls below a threshold (e.g., due to a blocked path in an IIoT system), the UE may request a new cluster supported by different TRPs based on measurements of broadcast signals received from the different TRPs or based on reference signal measurements by the different TRPs. In other cases, the UE may request to perform handover from one cluster to another cluster centric to a different UE. To join a cluster, the coordinating entity may allocate resources to the UE for communication with multiple TRPs within the cluster (which may be a new cluster) via dedicated resources associated with a resource pool for each of the multiple TRPs in the cluster. Once a new cluster is formed (or once a UE is handed over from one cluster to another), other UEs may be added to the cluster. Due to the dynamic nature of the formation of UE centric clusters, UEs may more often be within full coverage of a cluster in a CoMP system operating according to aspects described herein.

Aspects of the disclosure are initially described in the context of wireless communications systems. Aspects are then described with respect to process flows. Aspects of the disclosure are further illustrated by and described with reference to apparatus diagrams, system diagrams, and flowcharts that relate to mobile device centric clustering.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include or may consist of one symbol period (e.g., a duration of one modulation symbol) and one sub-carrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include or may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some examples, the wireless communications system 100 may allow for UE-centric clustering to support URLLC techniques in various environments. The formation of the UE-centric cluster may be based on measured channel conditions associated with a UE 115. The measurements may be performed by the UE 115 over communications received from a TRP 105 (e.g., via broadcast signals transmitted from one or more TRPs 105). Alternatively, the measurements may be performed by the TRP 105 using communications received from the UE 115 (e.g., via reference signals transmitted from the UE 115 to one or more TRPs 105).

Information corresponding to the channel conditions may be sent to a coordinating entity, which may be a node of the core network 130, from a TRP 105 or directly from the UE 115. The coordinating entity, based on the forwarded information, may determine a cluster for the UE 115. Each cluster may include a plurality of TRPs 105, and the TRPs 105 of the cluster may be informed of the cluster to which they are assigned (e.g., based on backhaul messages from the coordinating entity). The UE 115 may also be informed of the cluster and associated TRPs 105, either through one of the TRPs 105 of the cluster or by the coordinating entity. The UE 115 may then communicate with the TRPs 105 of the cluster using a resource pool allocated for the cluster or that is specific to a TRP 105 of the cluster. Should channel conditions deteriorate, the coordinating entity may add TRPs 105 to or remove TRPs 105 from the cluster.

In some examples, the clusters of the wireless communications system 100 may be static. The clusters may be initially formed prior to a UE 115 entering the wireless communications system 100 and the UE 115 may be assigned a cluster upon entering the wireless communications system 100. If the UE 115 moves within the wireless communications system 100, the coordinating entity may determine that a new cluster may improve channel conditions for the UE 115. The coordinating entity may then assign the UE 115 to a new cluster based on this determination (or based on a request from the UE 115 to form a new cluster). In some cases, the coordinating entity may dynamically add or remove clusters from the wireless communications system 100 (e.g., based on channel condition measurements for one or more UEs 115 or requests from UEs 115 for additional clusters).

Figure 2:
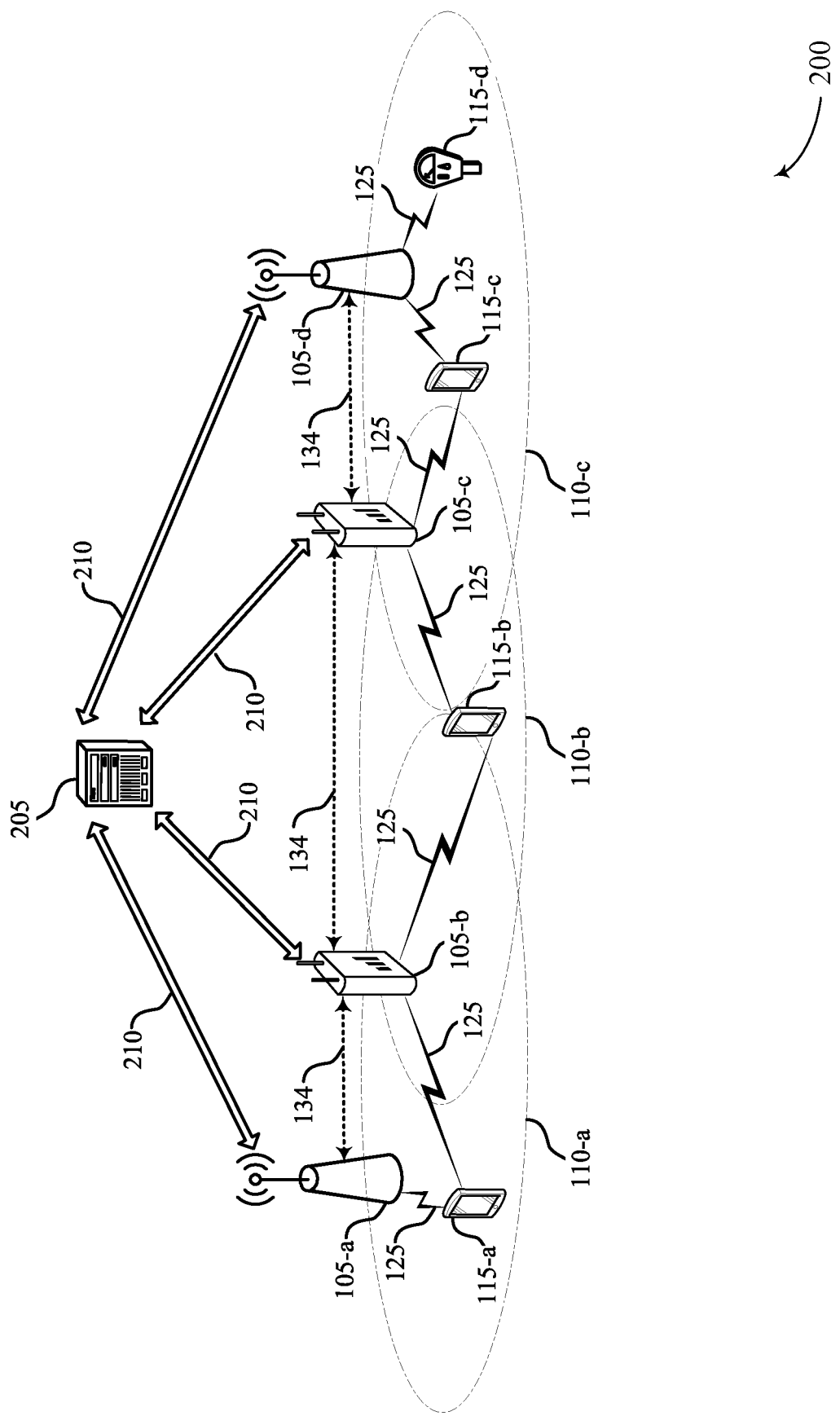
FIG. 2 illustrates an example of a wireless communications system that supports mobile device centric clustering in accordance with aspects of the present disclosure.

FIG. 2 illustrates an example of a wireless communications system 200 that supports mobile device centric clustering in accordance with various aspects of the present disclosure. In some examples, wireless communications system 200 may implement aspects of wireless communications system 100.

In wireless communications system 200, a coordinating entity 205 (e.g., a grand master, a multicell/multicast coordination entity (MCE), a node within the core network 130, etc.) may determine a cluster for a UE 115. The cluster may include multiple TRPs 105 capable of communicating with one or more UEs 115 within the cluster 110. The TRPs 105 may be any one of a base station, an eNodeB, an IoT gateway, a cell, etc. In some examples, the cluster 110 may be determined based on measurements of channel conditions (or other statistics) between the UEs 115 and one or more TRPs 105.

As shown in FIG. 2, TRPs 105-a and 105-b support communications with multiple UEs 115, such as UE 115-a within cluster 110-a. TRPs 105-b and 105-c support communications with multiple UEs 115, such as UE 115-b within cluster 110-b. TRPs 105-c and 105-d support communications with multiple UEs 115, such as UEs 115-c and 115-d within cluster 110-c.

In some cases, the TRPs 105 that are members of a given cluster 110 may change. For instance, the channel conditions for a UE 115 may change over time due to location of the UE 115, speed or movement of the UE 115, interference or signal quality variations between a UE 115 and one or more TRPs 105. In such cases, periodic or aperiodic (e.g., triggered) measurement reports may be sent from a UE 115 to one or more TRPs 105. The TRPs 105 may coordinate amongst themselves or may be coordinated by a separate entity (e.g., a coordinating entity 205) to determine which TRPs 105 are to support communication for a cluster 110 of the UE 115. The coordinating entity 205 may inform the TRPs 105 of this determination, and the TRPs 105 selected for the cluster may communicate with the UEs 115 over the same set of time-frequency resources.

In some cases, the coordinating entity 205 determines cluster formations based on measurements (e.g., a received power, a UE to TRP delay, etc.) received from the TRPs 105. In some examples, a UE 115-a in the wireless communications system 200 may transmit a reference signal (e.g., S0) over dedicated resources across all TRP resource pools, which may correspond to resource pools of TRPs 105 in the wireless communications system 200.

The TRPs 105 that receive the reference signal, such as the TRPs 105-a, 105-b, and 105-c, may measure the reference signal and forward the measurements to the coordinating entity 205. In this example, TRP 105-d may not receive the reference signal from UE 115-a, as the TRP 105-d may be out of range of the UE 115-a, or may experience too much interference to successfully decode the reference signal. The TRPs 105-a, 105-b, and 105-c may transmit these measurements over one or more backhaul links 210, such as Time-Sensitive Networking (TSN) links and/or Integrated Access and Backhaul (IAB) links, to the coordinating entity 205. Upon reception of the measurements, the coordinating entity 205 may determine a set of TRPs 105 to serve the UE 115-a in cluster 110-a.

Alternatively, the coordinating entity 205 may determine cluster formations based on measurements received from the UEs 115. For instance, a UE 115 may receive signals from various TRPs 105 in proximity to the UE 115. In one example, UE 115-c may receive communication signals (e.g., broadcast signals) from the TRPs 105-b, 105-c, and 105-d. The UE 115-c may measure channel conditions for each of the TRPs 105-b, 105-c, and 105-d separately, but may fail to measure channel conditions for 105-a, as the UE 115-c may not receive communication signals from the TRP 105-a, or may fail to successfully decode signals from the TRP 105-a.

In such cases, the UE 115-c may provide poor channel statistics or no information related to channel conditions for TRP 105-a. These signals may be transmitted over dedicated resources for signal measurements. UE 115-c may then transmit these measurements to either the coordinating entity 205 or at least one TRP 105 in proximity, where the TRP 105 may subsequently transmit the measurements to the coordinating entity 205. For example, the TRP 105-b may receive the measurement information from the UE 115-b, and the TRP 105-b may subsequently transmit the measurement information to the coordinating entity 205. This measurement information may be used by the coordinating entity 205 to determine a set of TRPs 105 to serve the UE 115-d in cluster 110-c.

In some cases, the coordinating entity 205 may also assign a resource pool of each of the set of TRPs 105 based on the channel condition measurements. The selected TRPs of a dynamic cluster, such as the TRPs 105-c and 105-d in a cluster 110-c, may be separated spatially to provide macro-diversity. In some cases, however, neighboring dynamic clusters may overlap. For instance, clusters 110-b and 110-c may overlap spatially and may not share the same resources, which may increase the potential for interference within the clusters 110-b and 110-c.

Dynamic clusters 110-a and 110-c, which may not spatially overlap, may utilize the same resources. The UEs 115 may also be signaled on a dedicated downlink resource of a resource pool to be used for communication in their assigned dynamic cluster 110. The UEs 115 may be signaled by the coordinating entity 205 or one more TRPs 105 in the dynamic cluster 110. In some cases, the UEs 115 may not know an associated identity of a TRP 105 in the dynamic cluster 110, as multiple TRPs 105 can share the same resource pool, which may be similar to a single frequency network (SFN). However, in these cases, the UEs 115 may still identify the resource pool for control channel monitoring.

In some cases, a UE 115 may move in relation to the TRPs 105. For example, UE 115-a may move to the position of UE 115-b. In such a scenario, some of the selected TRPs 105 of the dynamic cluster 110 may be removed. Additionally or alternatively, other TRPs not originally a part of the dynamic cluster 110 may be added to the dynamic cluster 110. For example, before moving to the position of the UE 115-b, the UE 115-a may be assigned the cluster 110-a, where the UE 115-a communicates with the TRPs 105-a and 105-b. However, when the UE 115-a moves to the position of the UE 115-b, the UE 115-a may be out of range of the TRP 105-a. Based on channel condition measurements during or after the movement of the UE 115-a, the coordinating entity 205 may determine to remove the TRP 105-a from the cluster 110-a and add the TRP 105-c to the cluster 110-a. The changes made to the dynamic cluster membership may be determined based on the measurement schemes discussed above.

Figure 3:
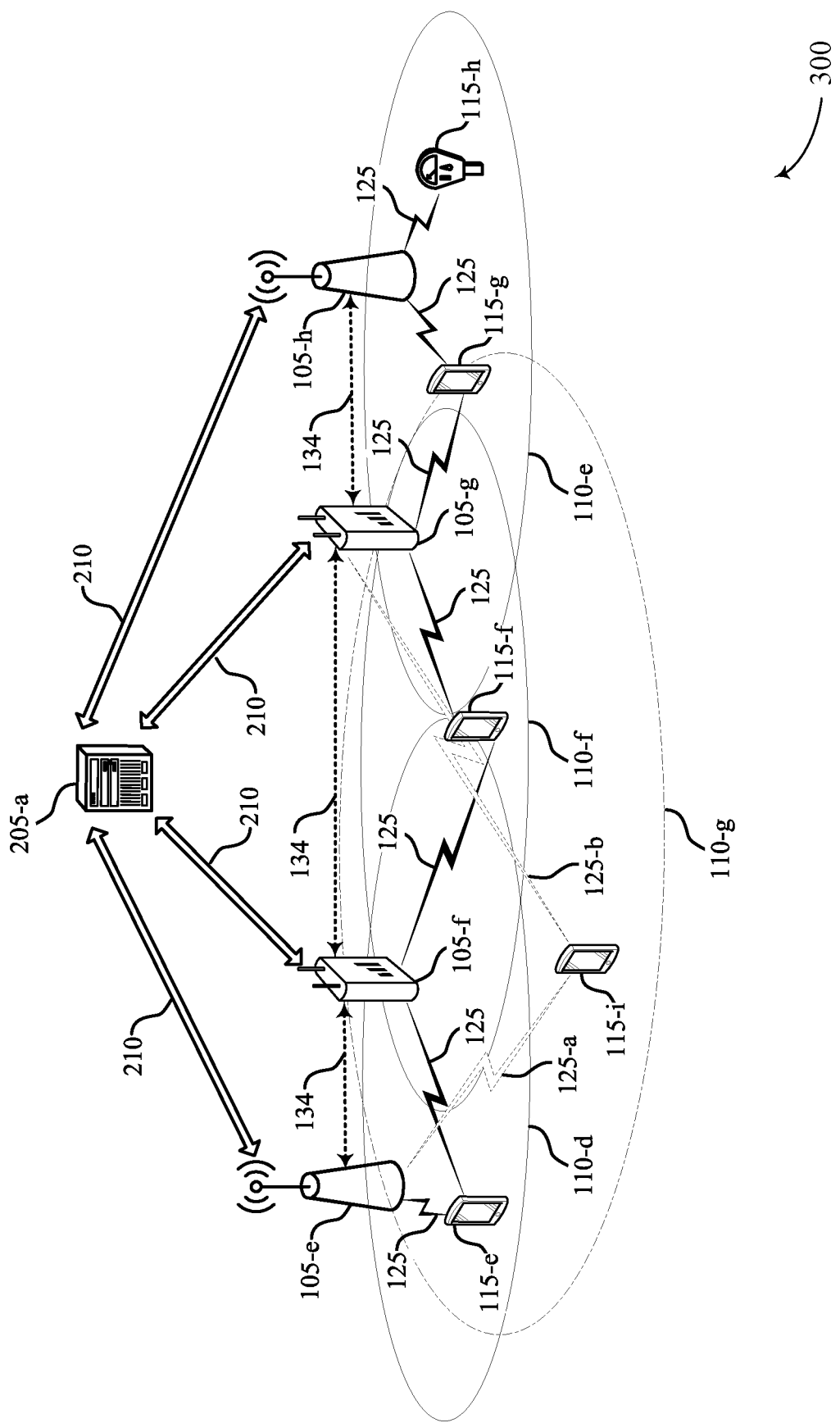
FIG. 3 illustrates an example of a wireless communications system that supports mobile device centric clustering in accordance with aspects of the present disclosure.

FIG. 3 illustrates an example of a wireless communications system 300 that supports mobile device centric clustering in accordance with various aspects of the present disclosure. In some examples, wireless communications system 300 may implement aspects of wireless communications system 100.

In wireless communications system 300, a coordinating entity 205-a may measure channel conditions or receive measurements of channel conditions (e.g., from one or more UEs 115 or one or more TRPs 105). Based on these measurements, the coordinating entity 205-a may determine a set of fixed clusters 110 for the wireless communications system 300. The determination may additionally be based on a set of UEs 115 to be initially deployed in the wireless communications system 300. For example, the coordinating entity 205-a initially forms fixed cluster 110-d and 110-e to support communications for the UEs 115, where the TRPs 105-e and 105-f are members of the fixed cluster 110-d, and the TRPs 105-g and 105-h are members of the fixed cluster 110-e. The UEs 115 may be signaled on dedicated downlink resources of resource pools to be used for communication in the fixed clusters 110. Thus, the UEs 115 are initially assigned to a fixed cluster 110 once they are activated or moved into the wireless communications system 300.

A UE 115 in the wireless communications system 300 may move out of one fixed cluster 110 range and into another fixed cluster 110 of the wireless communications system 300. For example, UE 115-e may move to the position of the UE 115-h. In this case, the UE 115-e may be added to the fixed cluster 110 which it moves into and may communicate with the TRPs 105 of the new fixed cluster 110.

For example, before moving to the position of the UE 115-h, the UE 115-e may be assigned the cluster 110-d, where the UE 115-e communicates with the TRPs 105-e and 105-f. However, when the UE 115-e moves to the position of the UE 115-h, the UE 115-e may be out of range of the fixed cluster 110-d. Based on channel condition measurements during or after the movement of the UE 115-e, the coordinating entity 205-a may determine to remove the UE 115-e from the fixed cluster 110-d and add the UE 115-e to the fixed cluster 110-e, where the UE 115-e may then receive communication from the TRPs 105-g and 105-h. This cluster handover may be based on measurements performed by the UE 115 or by the TRPs 105 of the wireless communications system 300, as discussed above with reference to FIG. 2.

In some cases, the wireless communications system 300 may implement a hybrid cluster formation. The coordinating entity 205-a may initially define the fixed clusters 110-d and 110-e as discussed above with reference to the static cluster formation. The UEs 115 within the wireless communications system 300 may initially communicate with the TRPs 105 in a fixed cluster 110. When a UE 115 moves within the wireless communications system 300, the UE 115 may request the formation of a new dynamic cluster 110 rather than stay in the original fixed cluster 110 or to be reassigned to another fixed cluster 110.

For example, the UE 115-g may move to the location of the UE 115-f, which may be outside of the fixed clusters 110-d and 110-e and channel conditions associated with each of the fixed clusters 110-d and 110-e may fall below a threshold. Thus, the UE 115-g may not experience sufficient channel conditions in either of the fixed clusters 110-d or 110-e. As a result, the UE 115-g may transmit a request to the coordinating entity 205-a to form a new dynamic cluster 110-f. Based on the request, the coordinating entity 205-a may form a dynamic cluster 110-f and may assign the TRPs 105-f and 105-g to the dynamic cluster 110-f.

Additionally or alternatively, the TRPs 105-f and 105-g may remain in their respective fixed clusters, or may be removed from their respective fixed clusters. In some cases, the UE 115 may be initially placed in a dynamic cluster 110-f, and may subsequently request to be assigned to a fixed cluster 110 once the UE 115 moves in the wireless communications system 300 (e.g., the UE 115 moves out of range of the dynamic cluster 110-f).

The coordinating entity 205-a may decide to add a dynamic cluster 110 to its set of fixed clusters, (e.g., if the coordinating entity 205-a received multiple dynamic cluster formation requests by the UEs 115). This may be a self-learning way to form a set of clusters 110, which may evolve over time. For example, the coordinating entity 205-a may form only dynamic clusters initially (e.g., no fixed clusters in the system 300). After the UEs 115 enter the wireless communications system 300 (e.g., via activation or movement), they may request to join various clusters. Based on the requests, the coordinating entity 205-a may decide to form a set of dynamic clusters, such as the cluster 110-g, which may represent the majority of the requests.

For example, the UE 115-i may enter the system 300 but may have poor channel conditions in the wireless communications system 300 (e.g., the UE 115-i is out of range of the fixed clusters 110, the TRP 105-f may have high interference levels when communicating with the UE 115-i, etc.). The coordinating entity 205-a may form a new cluster 110-g for the UE 115-i. The TRPs 105-e and 105-g may be assigned to the new cluster 110-g, and may communicate with the UE 115-i over communication links 125-a and 125-b. The communication links may be new links initiated subsequent to the formation of the cluster 110-g.

The set of clusters in the wireless communications system 300 may additionally evolve over time. For example, some fixed clusters 110 that are no longer assigned to or requested by multiple UEs 115 may be removed from the wireless communications system 300, while other clusters 110 that receive numerous requests may then be added to the wireless communications system 300.

In another example, UE 115-i may initially be assigned to a cluster served by TRPs 105-e and 105-f. TRP 105-f may be a primary TRP that may perform communications with UE 115-i. In some aspects, TRP 105-e may be a secondary TRP that may only perform communications with UE 115-*i* in certain situations. In an IIoT environment, for instance, shadowing (e.g., a blockage of a communication path due to a mechanical arm or other fast moving parts in the area) may reduce the channel quality between UE 115-*i* and TRP 105-*f*. In this case, UE 115-*i* may then begin communicating with TRP 105-*e*, which may then become the primary TRP (e.g., until channel quality with TRP 105-*f* increases).

Figure 4:
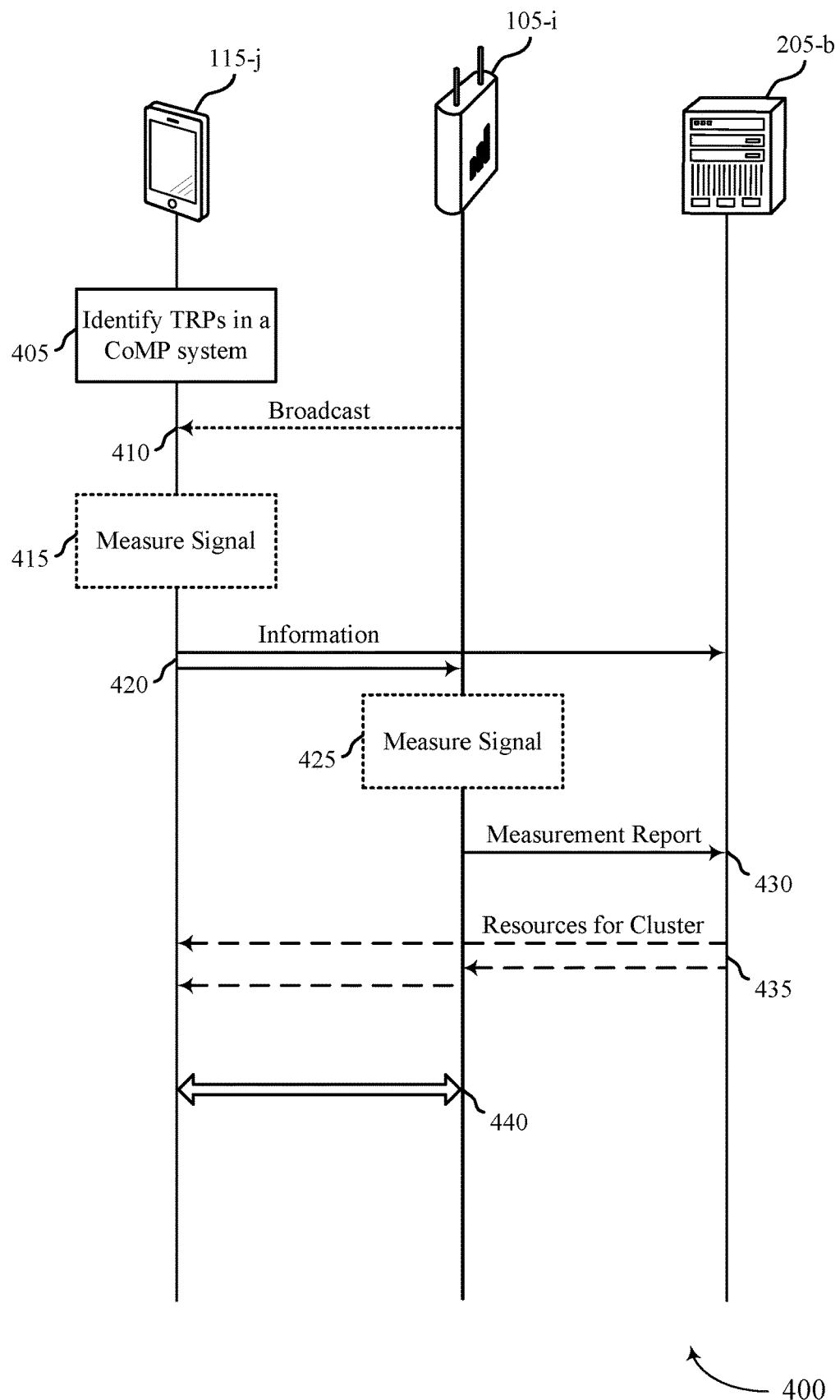
FIG. 4 illustrates an example of a process flow that supports mobile device centric clustering in accordance with aspects of the present disclosure.

FIG. 4 illustrates an example of a process flow 400 that supports mobile device centric clustering in accordance with various aspects of the present disclosure. In some examples, process flow 400 may implement aspects of wireless communications systems 100, 200, or 300. The process flow may include a UE 115-*j*, TRP 105-*i*, and a coordinating entity 205-*b*, which may be examples of the corresponding devices described herein.

At 405, the UE 115-*j* may identify a group of TRPs in a CoMP system. The group of TRPs may include TRP 105-*i*. In some cases, the UE 115-*j* may identify the group of TRPs via signaling from TRP 105-*i* or coordinating entity 205-*b*. The groups of TRPs may include multiple TRPs that support communication for static or dynamic clusters, which may be centric to the UE 115-*j*.

At 410, the TRP 105-*i* may optionally transmit a broadcast signal (or other reference signal), which may be used by the UE 115-*j* to estimate channel conditions. For instance, at 415, the UE 115-*j* may optionally perform channel condition measurements of the broadcast signal.

At 420, the UE 115-*j* may transmit information associated with measurements between the UE 115-*j* and the TRP 105-*i* of the group of TRPs. The information may be transmitted to one or both of the TRP 105-*i* and the coordinating entity 205-*b*.

In some cases, the information transmitted by the UE 115-*j* at 410 includes a reference signal, which may be used to measure channel conditions. For example, at 425, the TRP 105-*i* may optionally perform measurements of the reference signal received from the UE 115-*j*. In other cases, the information transmitted by the UE 115-*j* at 420 includes measurements (e.g., within a measurement report) related to the channel condition measurements of the broadcast signal optionally performed by the UE at 415.

At 430, the TRP 105-*i* may transmit a measurement report to the coordinating entity 205-*b*. The measurement report may include information related to a measurement report transmitted to the TRP 105-*i* (e.g., from the UE 115-*j* at 420), or may include information related to the signal measurements performed by the TRP 105-*i* at 425.

In either scenario, at 435 the coordinating entity 205-*b* may send an indication of resources for the cluster used for communication with the UE 115-*j* based on the measurement report received at 430. The indication of resources may be transmitted directly to the UE 115-*j*, or may be transmitted to the TRP 105-*i*, which may then forward the information along to UE 115-*j*, as shown. In some examples, the indication of the resources may be transmitted via a downlink message using resources dedicated for one or more TRPs (e.g., TRP 105-*i*) with which the UE 115-*j* may communicate. The downlink message or the dedicated resources themselves may indicate to the UE 115-*j* which resources (e.g., resource pool) is available for communication between the UE 115-*j* and the TRP 105-*i*.

At 440, UE 115-*j* may communicate with TRP 105-*i* based on the indication of resources at 435. For instance, the UE 115-*j* may communicate with TRP 105-*i* via a resource pool allocated for the cluster of TRP 105-*i*.

Figure 5:
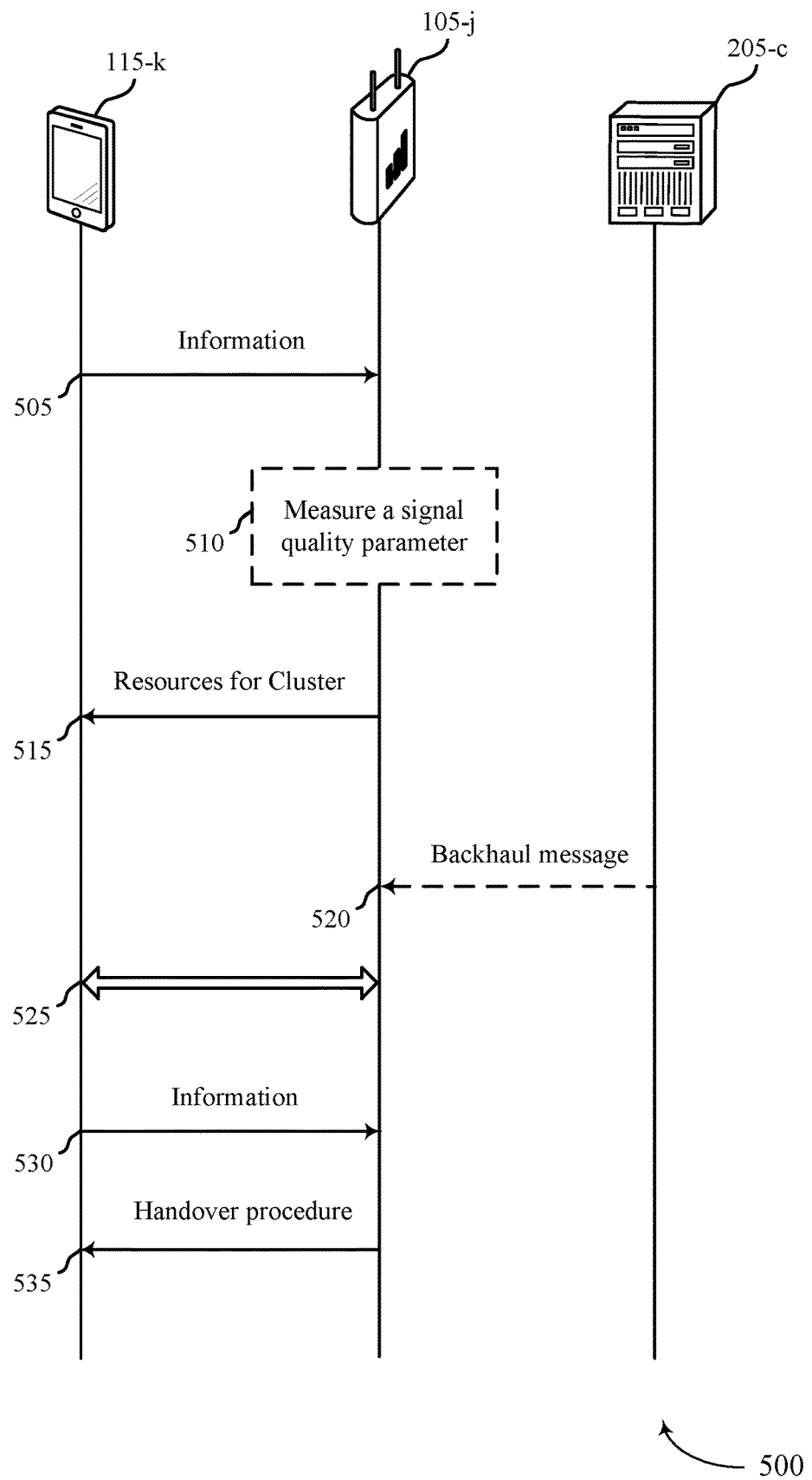
FIG. 5 illustrates an example of a process flow that supports mobile device centric clustering in accordance with aspects of the present disclosure.

FIG. 5 illustrates an example of a process flow 500 that supports mobile device centric clustering in accordance with various aspects of the present disclosure. In some examples, process flow 500 may implement aspects of wireless communications system 100. The process flow may include a UE 115-*k*, and TRP 105-*j* and a coordinating entity 205-*c*, which may be examples the corresponding devices described herein.

At 505, the TRP 105-*j* may receive information associated with measurements between the UE 115-*k* and the TRP 105-*j* of a group of TRPs in a CoMP system. The information may be received from one or both of the TRP 105-*j* and the coordinating entity 205-*c*.

In some cases, the information received from the UE 115-*k* may include a reference signal, which may be used to measure channel conditions. For example, at 510, the TRP 105-*j* may measure a signal quality parameter of the received reference signal. The TRP 105-*j* may transmit to the coordinating entity 205-*c* a measurement report that includes the signal quality parameter.

At 515, the TRP 105-*j* may transmit to the UE 115-*k* an indication of resources for a first CoMP cluster of the CoMP system, where the first CoMP cluster is associated with the TRP 105-*j*. The transmitting may be based on the received information associated with measurements between the UE 115-*k* and the TRP 105-*j*. Optionally, at 520, the TRP 105-*j* may receive from the coordinating entity 205-*c* a backhaul message that indicates resources for the first CoMP cluster based on the measurement report.

At 525, the TRP 105-*j* may communicate with the UE 115-*k* via a resource pool of the TRP 105-*i* based at least in part on the indication of resources for the first CoMP cluster.

At 530, the TRP 105-*j* may receive information associated with measurements between the UE 115-*k* and an additional TRP of the group of TRPs in a CoMP system. The information may be received from one or both of the TRP 105-*j* and the coordinating entity 205-*c*.

At 535, the TRP 105-*j* may perform a handover procedure from the first CoMP cluster to a second CoMP cluster. The handover procedure may be based on the information associated with measurements between the UE 115-*k* and an additional TRP of the group of TRPs in a CoMP system. In some examples the CoMP may include the TRP 105-*j* and the additional TRP. In other cases, the second CoMP cluster may include the additional TRP and exclude the TRP 105-*j*.

Figure 6:
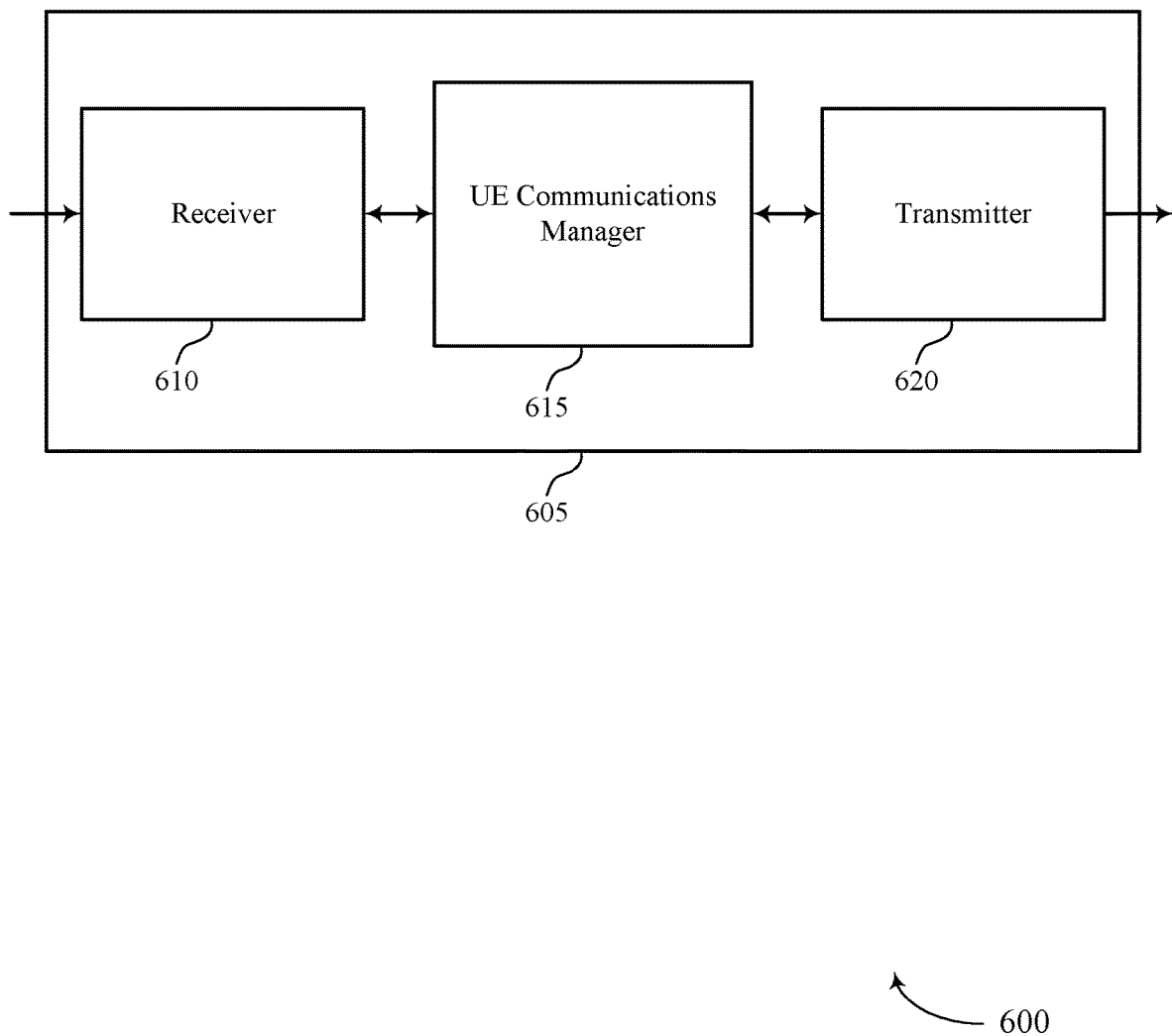
FIGS. 6 through 8 show block diagrams of a device that supports mobile device centric clustering in wireless systems in accordance with aspects of the present disclosure.

FIG. 6 shows a block diagram 600 of a wireless device 605 that supports mobile device centric clustering in wireless systems in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to mobile device centric clustering in wireless systems, etc.). Information may be passed on to other components of the device 605. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9. UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may identify a group of TRPs 105 in a coordinated wireless system, transmit information associated with measurements between a UE 115 and a TRP 105 of the group of TRPs 105, receive, based on transmitting the information associated with measurements between the UE 115 and the TRP 105, an indication of resources for a first coordinated cluster of the coordinated wireless system, and communicate with the TRP 105 via a resource pool of the TRP 105 based on the indication of resources. The UE communications manager 615 may also identify a set of coordinated clusters in a coordinated wireless system that includes a group of TRPs 105, where each coordinated cluster is associated with a subset of the group of TRPs 105, determine that a set of channel statistics for each coordinated cluster of the set of coordinated clusters is below a threshold, and transmit, to at least one TRP 105 of the group of TRPs 105, a request to form an additional coordinated cluster based on the determination.

Transmitter 620 may transmit signals generated by other components of the device 605. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
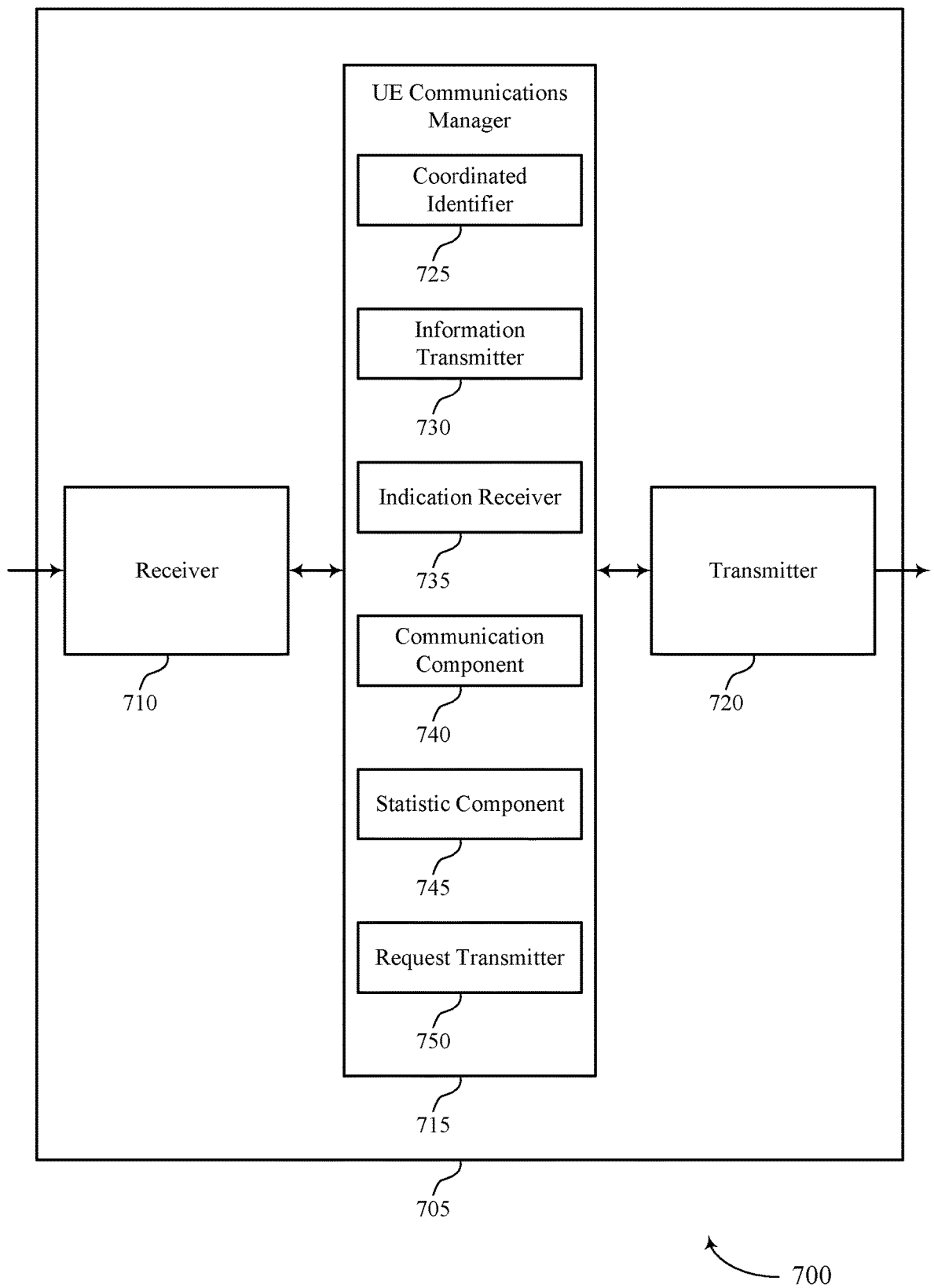

FIG. 7 shows a block diagram 700 of a wireless device 705 that supports mobile device centric clustering in wireless systems in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to mobile device centric clustering in wireless systems, etc.). Information may be passed on to other components of the device 705. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9.

UE communications manager 715 may also include coordinated identifier 725, information transmitter 730, indication receiver 735, communication component 740, statistic component 745, and request transmitter 750.

Coordinated identifier 725 may identify a group of TRPs 105 in a coordinated wireless system and identify a set of coordinated clusters in a coordinated wireless system that includes a group of TRPs 105, where each coordinated cluster is associated with a subset of the group of TRPs 105.

Information transmitter 730 may transmit information associated with measurements between a UE 115 and a TRP 105 of the group of TRPs 105. In some cases, transmitting information associated with measurements between the UE 115 and the TRP 105 includes transmitting a reference signal on dedicated resources for each resource pool associated with the group of TRPs 105. In some cases, transmitting the reference signal on dedicated resources includes transmitting the reference signal to the TRP 105.

Indication receiver 735 may receive, based on transmitting the information associated with measurements between the UE 115 and the TRP 105, an indication of resources for a first coordinated cluster of the coordinated wireless system and receive an indication that the additional coordinated cluster has been formed based on the request, where the additional coordinated cluster is associated with multiple TRPs 105 of the group of TRPs 105.

Communication component 740 may communicate with the TRP 105 via a resource pool of the TRP 105 based on the indication of resources and communicate with the second TRP 105 via the second resource pool. In some cases, the resource pool and the second resource pool may be the same. In some cases, the resource pool and the second resource pool may not be the same. In some cases, communicating with the TRP 105 includes monitoring a set of control channel resources associated with the resource pool of the TRP 105 based on the indication of resources.

Statistic component 745 may determine that a set of channel statistics for each coordinated cluster of the set of coordinated clusters is below a threshold, perform channel statistic measurements for one or more clusters of the set of coordinated clusters, where the set of channel statistics for each coordinated cluster of the set of coordinated clusters is determined to be below the threshold based on the channel statistic measurements, and measure channel statistics for a first coordinated cluster of the set of coordinated clusters.

Request transmitter 750 may transmit, to at least one TRP 105 of the group of TRPs 105, a request to form an additional coordinated cluster based on the determination.

Transmitter 720 may transmit signals generated by other components of the device 705. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
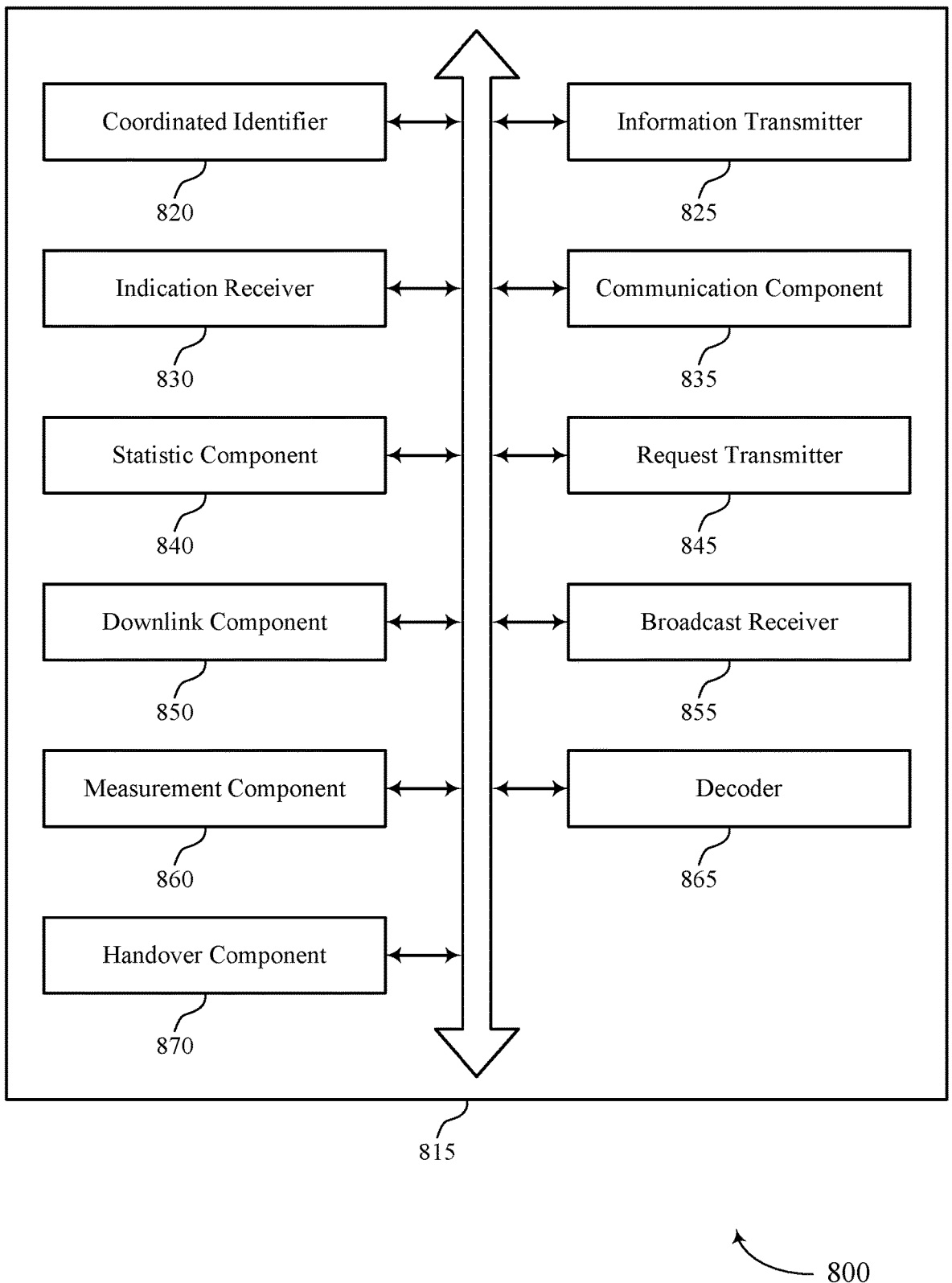

FIG. 8 shows a block diagram 800 of a UE communications manager 815 that supports mobile device centric clustering in wireless systems in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include coordinated identifier 820, information transmitter 825, indication receiver 830, communication component 835, statistic component 840, request transmitter 845, downlink component 850, broadcast receiver 855, measurement component 860, decoder 865, and handover component 870. Each of these modules may communicate, directly or indirectly, with one another (e.g., via one or more buses).

Coordinated identifier 820 may identify a group of TRPs 105 in a coordinated wireless system and identify a set of coordinated clusters in a coordinated wireless system that includes a group of TRPs 105, where each coordinated cluster is associated with a subset of the group of TRPs 105.

Information transmitter 825 may transmit information associated with measurements between a UE 115 and a TRP 105 of the group of TRPs 105. In some cases, transmitting information associated with measurements between the UE 115 and the TRP 105 includes transmitting a reference signal on dedicated resources for each resource pool associated with the group of TRPs 105. In some cases, transmitting the reference signal on dedicated resources includes transmitting the reference signal to the TRP 105.

Indication receiver 830 may receive, based on transmitting the information associated with measurements between the UE 115 and the TRP 105, an indication of resources for a first coordinated cluster of the coordinated wireless system and receive an indication that the additional coordinated cluster has been formed based on the request, where the additional coordinated cluster is associated with multiple TRPs 105 of the group of TRPs 105.

Communication component 835 may communicate with the TRP 105 via a resource pool of the TRP 105 based on the indication of resources and communicate with the second TRP 105 via the second resource pool. In some cases, the resource pool and the second resource pool may be the same. In some cases, the resource pool and the second resource pool may not be the same. In some cases, communicating with the TRP 105 includes monitoring a set of control channel resources associated with the resource pool of the TRP 105 based on the indication of resources.

Statistic component 840 may determine that a set of channel statistics for each coordinated cluster of the set of coordinated clusters is below a threshold, perform channel statistic measurements for one or more clusters of the set of coordinated clusters, where the set of channel statistics for each coordinated cluster of the set of coordinated clusters is determined to be below the threshold based on the channel statistic measurements, and measure channel statistics for a first coordinated cluster of the set of coordinated clusters.

Request transmitter 845 may transmit, to at least one TRP 105 of the group of TRPs 105, a request to form an additional coordinated cluster based on the determination.

Downlink component 850 may receive a downlink message via dedicated resources for the resource pool of the TRP 105 based on the transmitted reference signal, receive a downlink message via dedicated resources for a second resource pool of a second TRP 105 of the group of TRPs 105 based on the transmitted reference signal, receive a downlink message via dedicated resources for the resource pool of the TRP 105 based on the measurement report, and receive a downlink message via dedicated resources for a second resource pool of a second TRP 105 of the group of TRPs 105 based on the measurement report. In some cases, the downlink message is received from the at least one TRP 105 or a core network node 205. In some cases, the downlink message is received from the at least one TRP 105 or a core network node 205.

Broadcast receiver 855 may receive a broadcast signal from the TRP 105.

Measurement component 860 may measure a signal quality parameter of the broadcast signal, where the information associated with measurements between the UE 115 and the TRP 015 includes a measurement report that includes the signal quality parameter. In some cases, the measurement report is transmitted to multiple TRPs 105 including the TRP 105 or a core network node 205 in communication with multiple TRPs 105 including the TRP 105.

Decoder 865 may decode at least one control channel message from the TRP 105 based on the monitoring.

Handover component 870 may perform handover from the first coordinated cluster to a second coordinated cluster based on measurements between the UE 115 and an additional TRP 105 of the group of TRPs 105, where the second coordinated cluster includes the TRP 105 and the additional TRP 105, perform handover from the first coordinated cluster to a second coordinated cluster based on measurements between the UE 115 and an additional TRP 105 of the group of TRPs 105, where the second coordinated cluster includes the additional TRP 105 and excludes the TRP 105, perform handover from a first coordinated cluster of the set of coordinated clusters to the additional coordinated cluster based on the request to form the additional coordinated cluster, and perform handover from the additional coordinated cluster to the first coordinated cluster based on the measured channel statistics.

Figure 9:
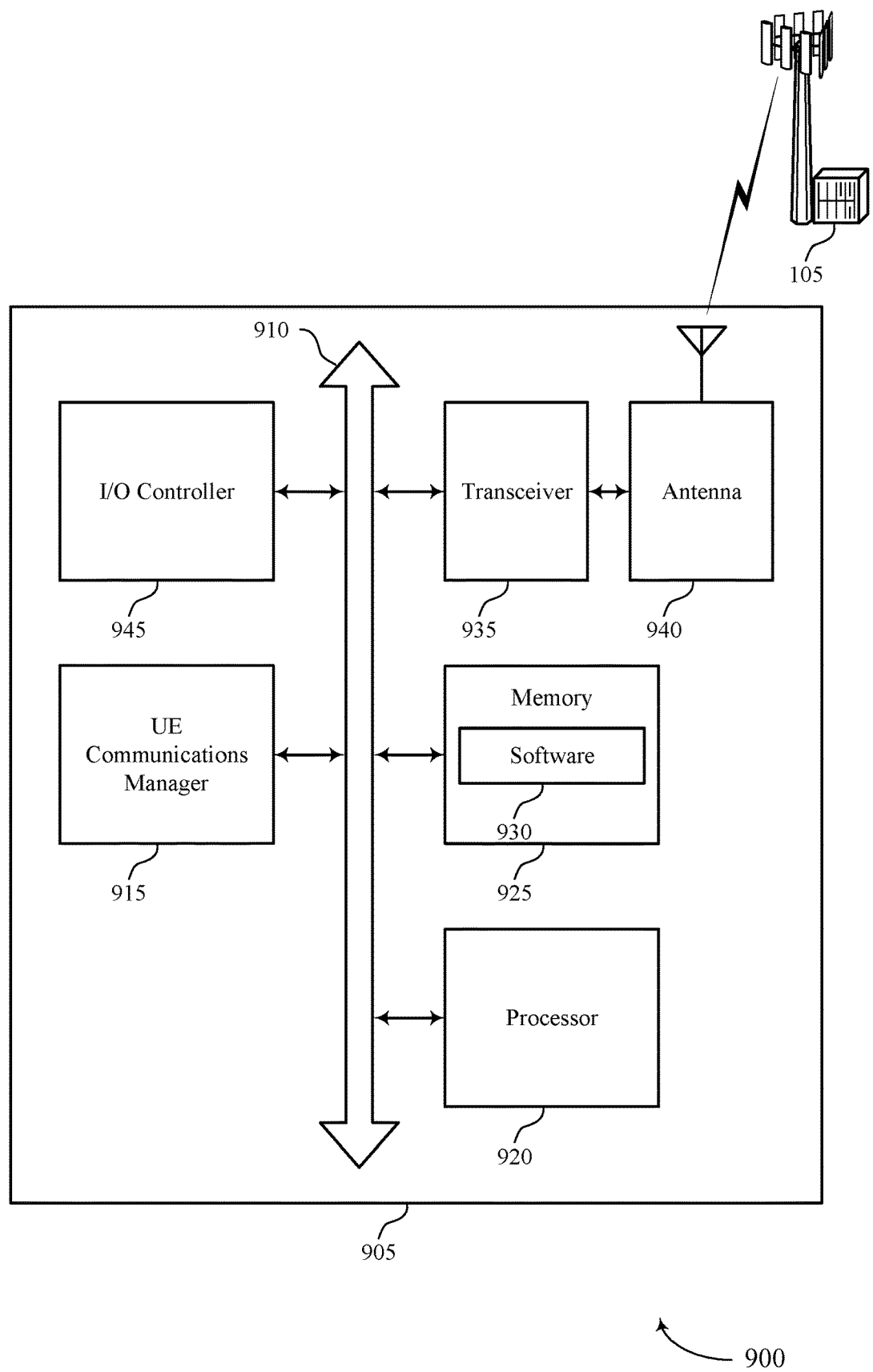
FIG. 9 illustrates a block diagram of a system including a user equipment (UE) that supports mobile device centric clustering in wireless systems in accordance with aspects of the present disclosure.

FIG. 9 shows a diagram of a system 900 including a device 905 that supports mobile device centric clustering in wireless systems in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting mobile device centric clustering in wireless systems).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support mobile device centric clustering in wireless systems. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device 905 may include a single antenna 940. However, in some cases the device 905 may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
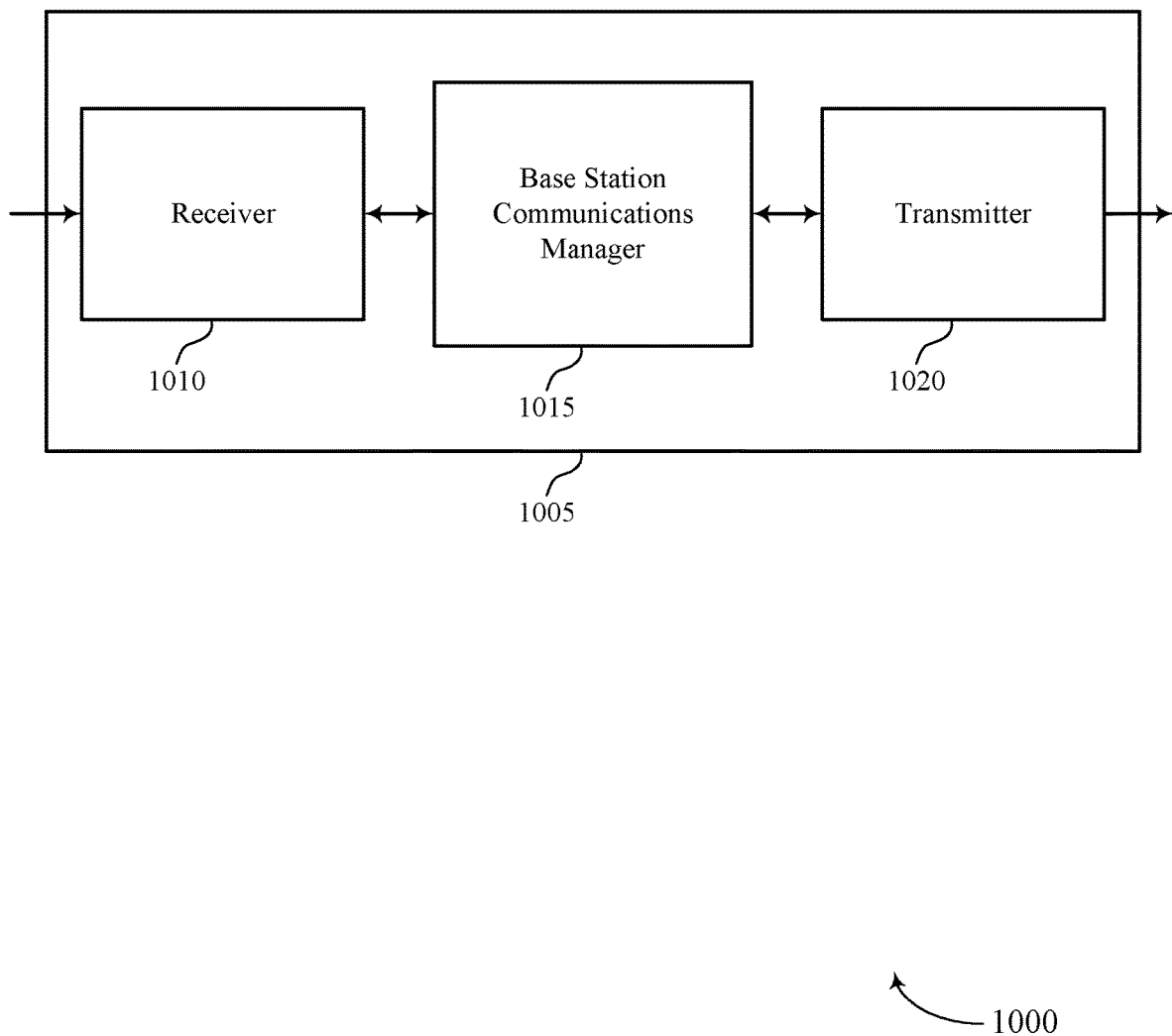
FIGS. 10 through 12 show block diagrams of a device that supports mobile device centric clustering in wireless systems in accordance with aspects of the present disclosure.

FIG. 10 shows a block diagram 1000 of a wireless device 1005 that supports mobile device centric clustering in wireless systems in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to mobile device centric clustering in wireless systems, etc.). Information may be passed on to other components of the device 1005. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13.

Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may receive, from a UE 115, information associated with measurements between the UE 115 and a TRP 105 of a group of TRPs 105 in a coordinated wireless system, transmit, to the UE 115 based on the information associated with measurements between the UE 115 and the TRP 105, an indication of resources for a first coordinated cluster of the coordinated wireless system, where the first coordinated cluster is associated with the TRP 105, and communicate with the UE 115 via a resource pool of the TRP 105 based on the indication of resources for the first coordinated cluster. The base station communications manager 1015 may also identify a set of coordinated clusters in a coordinated wireless system that includes a group of TRPs 105, where each coordinated cluster is associated with a subset of the group of TRPs 105 and receive, from a UE 115, a request to form an additional coordinated cluster based on measurements between the UE 115 and one or more TRPs 105 of the group of TRPs 105.

Transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
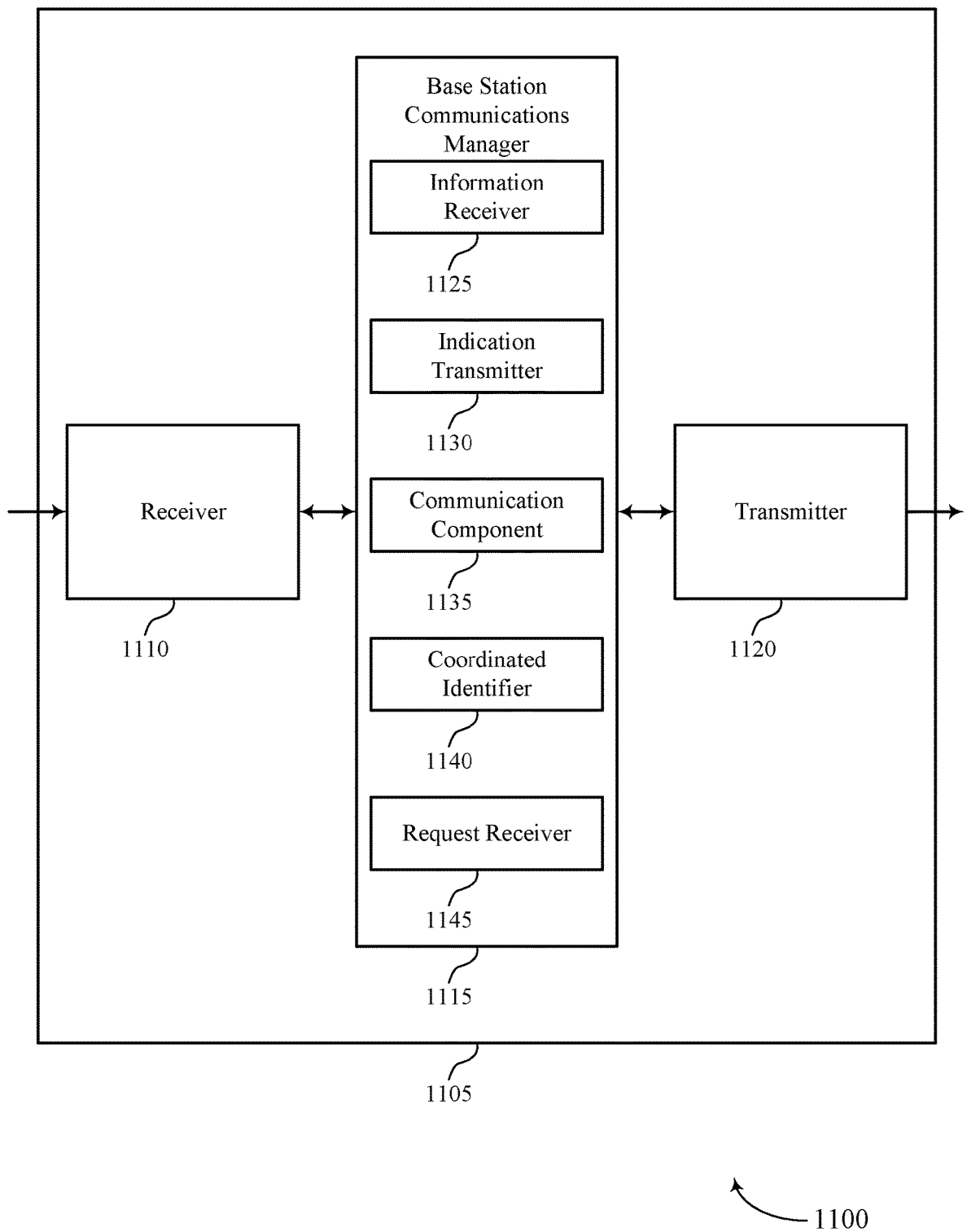

FIG. 11 shows a block diagram 1100 of a wireless device 1105 that supports mobile device centric clustering in wireless systems in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to mobile device centric clustering in wireless systems, etc.). Information may be passed on to other components of the device 1105. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13.

Base station communications manager 1115 may also include information receiver 1125, indication transmitter 1130, communication component 1135, coordinated identifier 1140, and request receiver 1145.

Information receiver 1125 may receive, from a UE 115, information associated with measurements between the UE 115 and a TRP 105 of a group of TRPs 105 in a coordinated wireless system. In some cases, receiving information associated with measurements between the UE 115 and the TRP 105 includes: receiving, from the UE 115, a reference signal for measurement by the TRP 105.

Indication transmitter 1130 may transmit, to the UE 115 based on the information associated with measurements between the UE 115 and the TRP 105, an indication of resources for a first coordinated cluster of the coordinated wireless system, where the first coordinated cluster is associated with the TRP 105, transmit, to the UE 115, the indication that the additional coordinated cluster has been formed, and transmit, to the second UE 115, an indication to join the additional coordinated cluster. In some cases, transmitting the indication of resources includes: transmitting, to the UE 115, a downlink message via dedicated resources for the resource pool of the TRP 105.

Communication component 1135 may communicate with the UE 115 via a resource pool of the TRP 105 based on the indication of resources for the first coordinated cluster.

Coordinated identifier 1140 may identify a set of coordinated clusters in a coordinated wireless system that includes a group of TRPs 105, where each coordinated cluster is associated with a subset of the group of TRPs 105.

Request receiver 1145 may receive, from a UE 115, a request to form an additional coordinated cluster based on measurements between the UE 115 and one or more TRPs 105 of the group of TRPs 105, receive, from the UE 115, a handover request to perform handover from the additional coordinated cluster to a first coordinated cluster of the group of TRPs 105, receive, from the UE 115, a handover request to perform handover from a first coordinated cluster of the group of TRPs 105 to the additional coordinated cluster, and receive, from a second UE 115, a join request to join a cluster of the coordinated system.

Transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
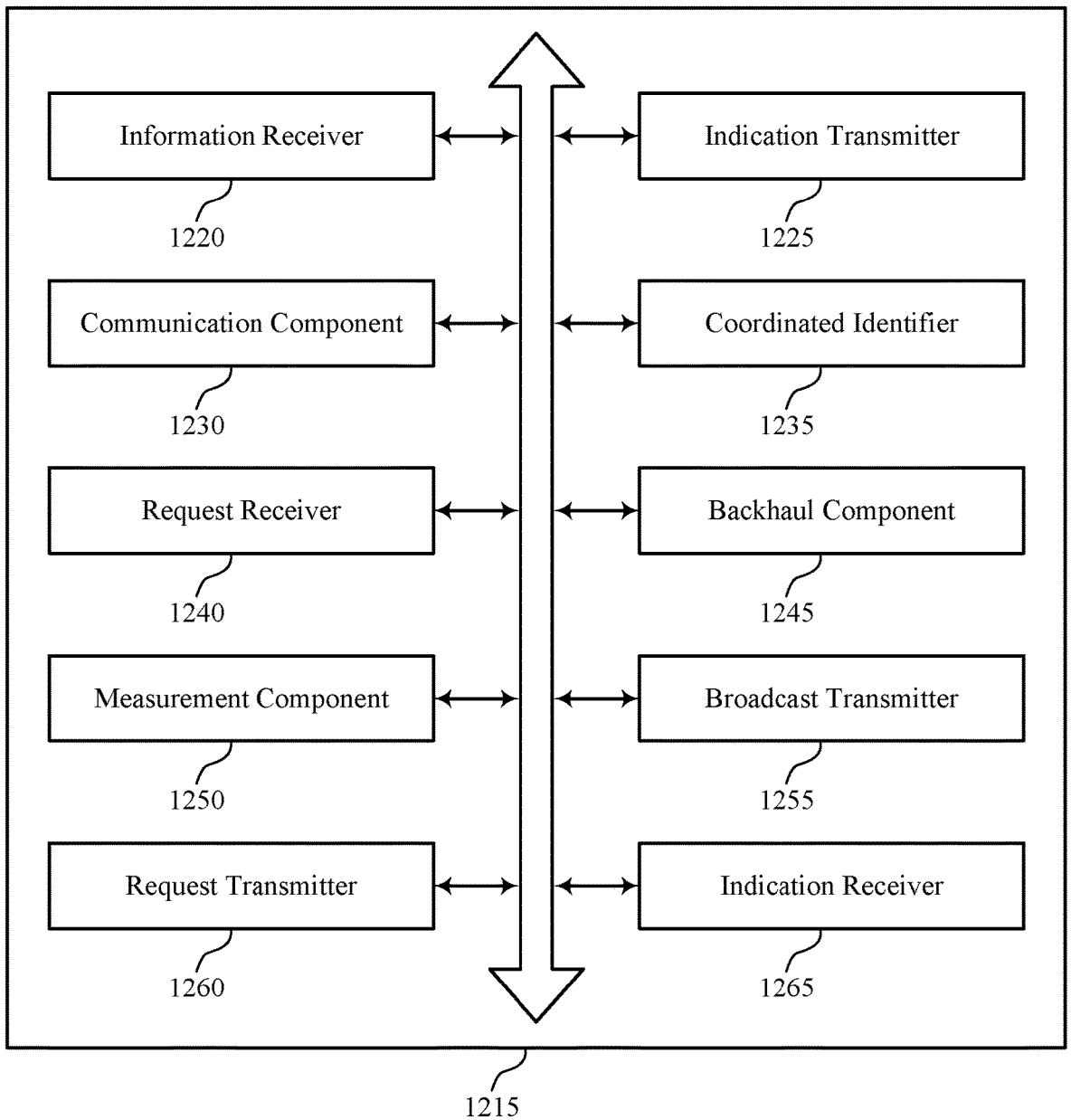

FIG. 12 shows a block diagram 1200 of a base station communications manager 1215 that supports mobile device centric clustering in wireless systems in accordance with aspects of the present disclosure. The base station communications manager 1215 may be an example of aspects of a base station communications manager 1315 described with reference to FIGS. 10, 11, and 13. The base station communications manager 1215 may include information receiver 1220, indication transmitter 1225, communication component 1230, coordinated identifier 1235, request receiver 1240, backhaul component 1245, measurement component 1250, broadcast transmitter 1255, request transmitter 1260, and indication receiver 1265. Each of these modules may communicate, directly or indirectly, with one another (e.g., via one or more buses).

Information receiver 1220 may receive, from a UE 115, information associated with measurements between the UE 115 and a TRP 105 of a group of TRPs 105 in a coordinated wireless system. In some cases, receiving information associated with measurements between the UE 115 and the TRP 105 includes: receiving, from the UE 115, a reference signal for measurement by the TRP 105.

Indication transmitter 1225 may transmit, to the UE 115 based on the information associated with measurements between the UE 115 and the TRP 105, an indication of resources for a first coordinated cluster of the coordinated wireless system, where the first coordinated cluster is associated with the TRP 105, transmit, to the UE 115, the indication that the additional coordinated cluster has been formed, and transmit, to the second UE 115, an indication to join the additional coordinated cluster. In some cases, transmitting the indication of resources includes: transmitting, to the UE 115, a downlink message via dedicated resources for the resource pool of the TRP 105.

Communication component 1230 may communicate with the UE 115 via a resource pool of the TRP 105 based on the indication of resources for the first coordinated cluster.

Coordinated identifier 1235 may identify a set of coordinated clusters in a coordinated wireless system that includes a group of TRPs 105, where each coordinated cluster is associated with a subset of the group of TRPs 105.

Request receiver 1240 may receive, from a UE 115, a request to form an additional coordinated cluster based on measurements between the UE 115 and one or more TRPs 105 of the group of TRPs 105, receive, from the UE 115, a handover request to perform handover from the additional coordinated cluster to a first coordinated cluster of the group of TRPs 105, receive, from the UE 115, a handover request to perform handover from a first coordinated cluster of the group of TRPs 105 to the additional coordinated cluster, and receive, from a second UE 115, a join request to join a cluster of the coordinated system.

Backhaul component 1245 may receive, from a core network node 205, a backhaul message that indicates resources for the first coordinated cluster and receive, from the core network node 205, a backhaul message that indicates resources for the first coordinated cluster based on the measurement report.

Measurement component 1250 may measure a signal quality parameter of the reference signal received from the UE 115, transmit, to a core network node 205, a measurement report that includes the signal quality parameter, and transmit the measurement report to a core network node 205.

Broadcast transmitter 1255 may transmit a broadcast signal to the UE 115, where the information associated with measurements between the UE 115 and the TRP 105 includes a measurement report based on the broadcast signal.

Request transmitter 1260 may transmit, to a core network node 205, the request to form the additional coordinated cluster.

Indication receiver 1265 may receive, from the core network node 205, an indication that the additional coordinated cluster has been formed based on the request.

Figure 13:
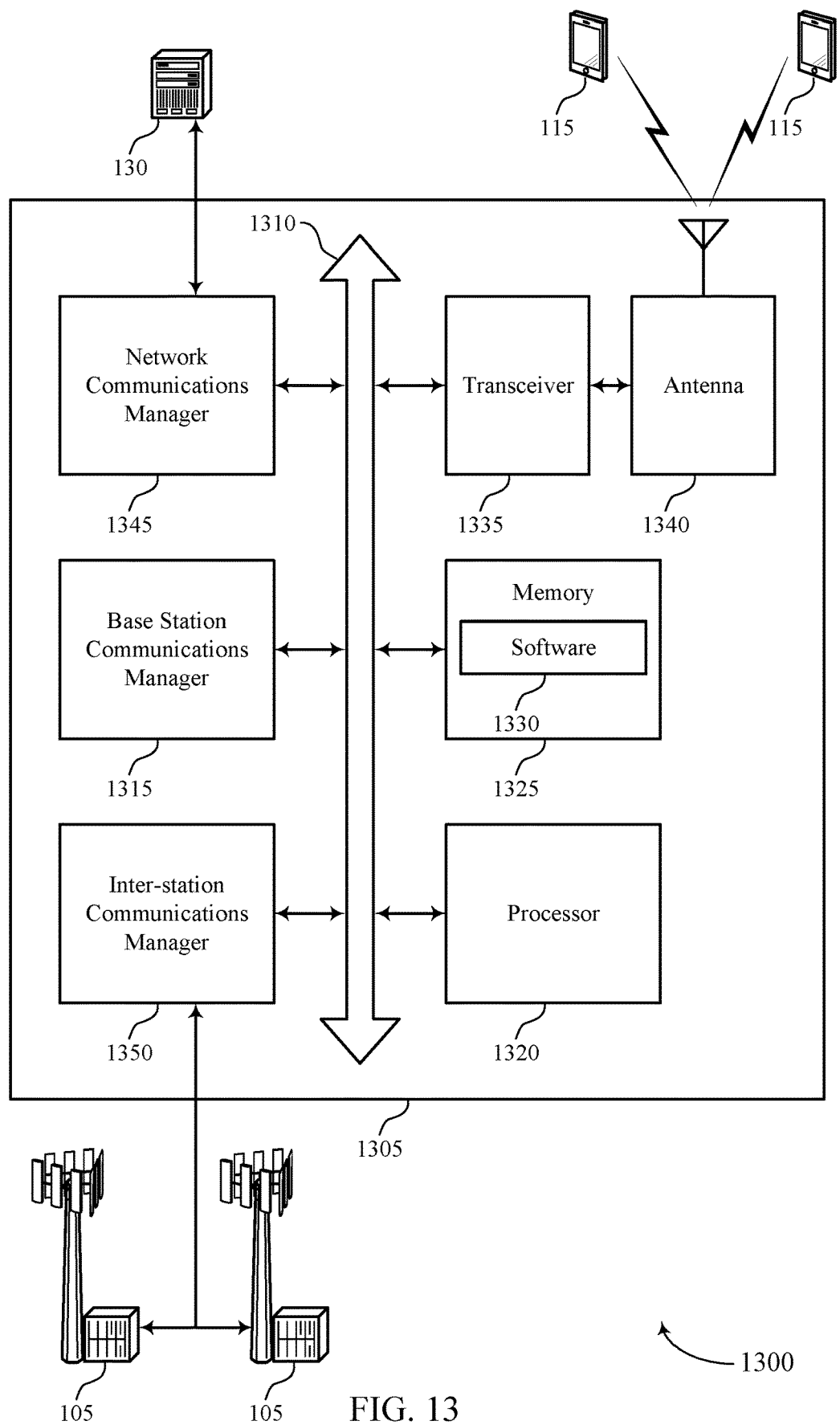
FIG. 13 illustrates a block diagram of a system including a base station that supports mobile device centric clustering in wireless systems in accordance with aspects of the present disclosure.

FIG. 13 shows a diagram of a system 1300 including a device 1305 that supports mobile device centric clustering in wireless systems in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting mobile device centric clustering in wireless systems).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support mobile device centric clustering in wireless systems. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device 1305 may include a single antenna 1340. However, in some cases the device 1305 may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
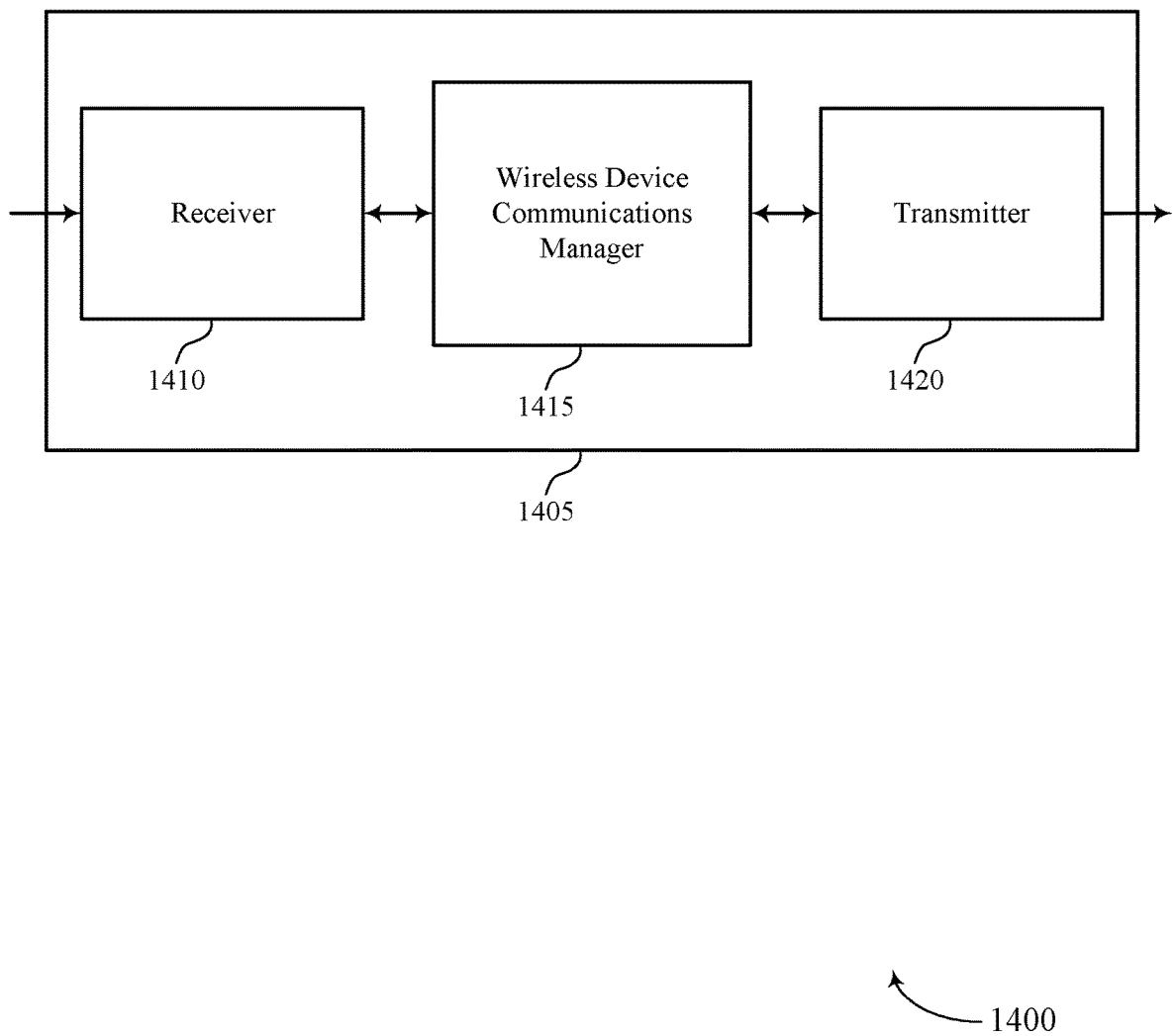
FIGS. 14 through 16 show block diagrams of a device that supports mobile device centric clustering in wireless systems in accordance with aspects of the present disclosure.

FIG. 14 shows a block diagram 1400 of a wireless device 1405 that supports mobile device centric clustering in wireless systems in accordance with aspects of the present disclosure. Wireless device 1405 may be an example of aspects of a wireless device such as a base station 105, a TRP 105, or a core network node 205 as described herein. Wireless device 1405 may include receiver 1410, wireless device communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to mobile device centric clustering in wireless systems, etc.). Information may be passed on to other components of the device 1405. The receiver 1410 may be an example of aspects of the transceiver 1735 described with reference to FIG. 17. The receiver 1410 may utilize a single antenna or a set of antennas.

Wireless device communications manager 1415 may be an example of aspects of the wireless device communications manager 1715 described with reference to FIG. 17. Wireless device communications manager 1415 and/or at least some of its various sub-components may be implemented in hardware, software executed by a processor, firmware, or any combination thereof. If implemented in software executed by a processor, the functions of the wireless device communications manager 1415 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The wireless device communications manager 1415 and/or at least some of its various sub-components may be physically located at various positions, including being distributed such that portions of functions are implemented at different physical locations by one or more physical devices. In some examples, wireless device communications manager 1415 and/or at least some of its various sub-components may be a separate and distinct component in accordance with various aspects of the present disclosure. In other examples, wireless device communications manager 1415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Wireless device communications manager 1415 may identify a group of TRPs 105 accessible by a UE 115 in a coordinated wireless system, receive information associated with signal measurements between the UE 115 and the group of TRPs 105, dynamically select a coordinated cluster of TRPs 105 from the group of TRPs 105 for communication with the UE 115 based on the signal measurements, and communicate with the UE 115 via one or more of the TRPs 105 from the coordinated cluster of TRPs 105.

Transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1735 described with reference to FIG. 17. The transmitter 1420 may utilize a single antenna or a set of antennas.

Figure 15:
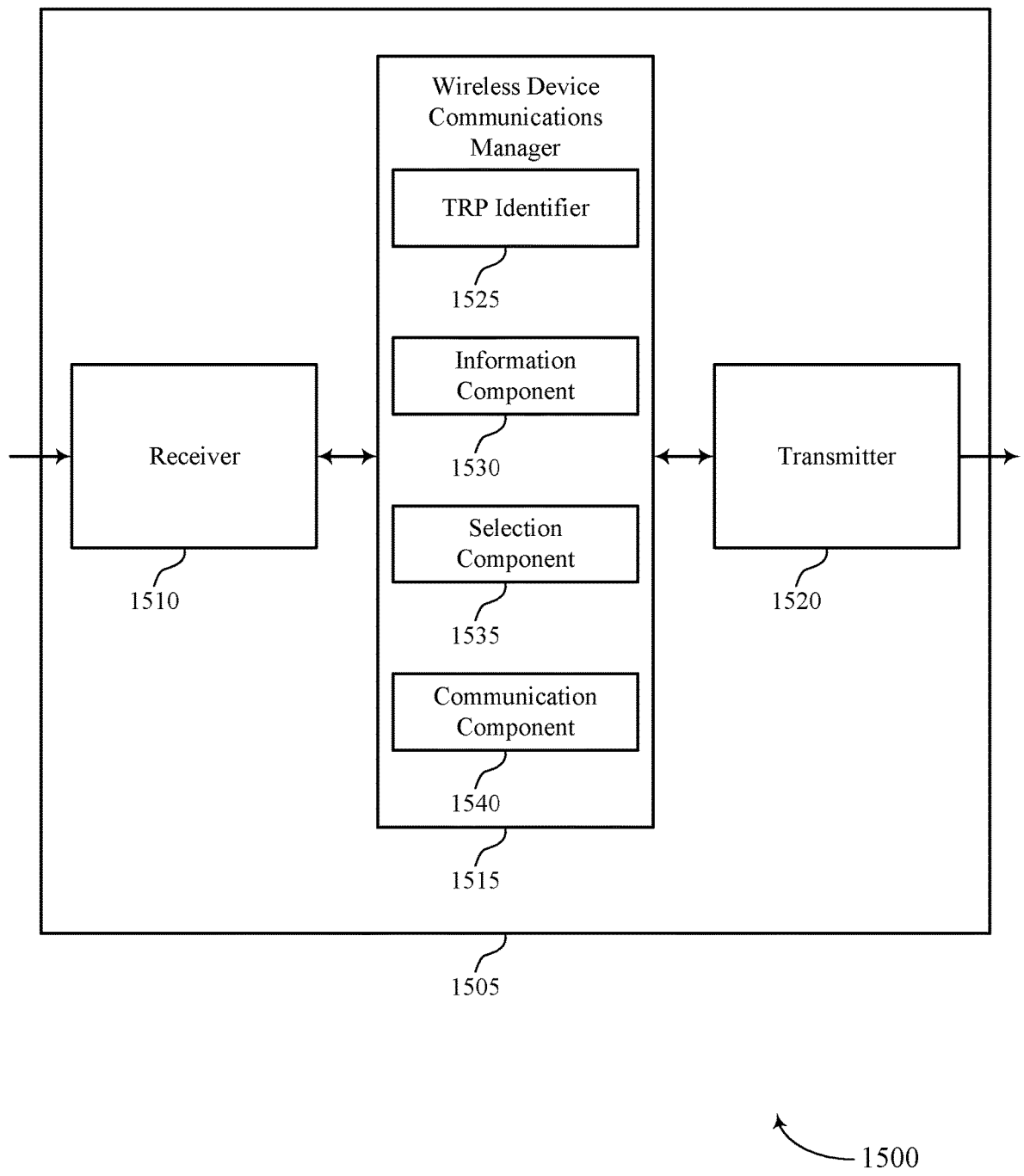

FIG. 15 shows a block diagram 1500 of a wireless device 1505 that supports mobile device centric clustering in wireless systems in accordance with aspects of the present disclosure. Wireless device 1505 may be an example of aspects of a wireless device 1405 or a wireless device such as a base station 105, a TRP 105, or a core network node 205 as described with reference to FIG. 14. Wireless device 1505 may include receiver 1510, wireless device communications manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to mobile device centric clustering in wireless systems, etc.). Information may be passed on to other components of the device 1505. The receiver 1510 may be an example of aspects of the transceiver 1735 described with reference to FIG. 17. The receiver 1510 may utilize a single antenna or a set of antennas.

Wireless device communications manager 1515 may be an example of aspects of the wireless device communications manager 1715 described with reference to FIG. 17. Wireless device communications manager 1515 may also include TRP identifier 1525, information component 1530, selection component 1535, and communication component 1540.

TRP identifier 1525 may identify a group of TRPs 105 accessible by a UE 115 in a coordinated wireless system.

Information component 1530 may receive information associated with signal measurements between the UE 115 and the group of TRPs 105, receive additional information associated with signal measurements between the UE 115 and the group of TRPs 105, and receive additional information associated with signal measurements between a second UE 115 and the group of TRPs 105.

Selection component 1535 may dynamically select a coordinated cluster of TRPs 105 from the group of TRPs 105 for communication with the UE 115 based on the signal measurements, dynamically select a second coordinated cluster of TRPs 105 from the group of TRPs 105 for communication with the UE 115 based on the signal measurements, where the second coordinated cluster includes at least one TRP 105 different from TRPs 105 of the coordinated cluster, and dynamically select the coordinated cluster of TRPs 105 from the group of TRPs 105 for communication with the second UE 115 based on the signal measurements. In some cases, the coordinated cluster of TRPs 105 is dynamically selected based on preferences associated with the UE 115, preferences associated with at least one other UE 115, environmental conditions, capabilities of the UE 115 or a second UE 115 in communication with the coordinated cluster, or a combination thereof.

Communication component 1540 may communicate with the UE 115 via one or more of the TRPs 105 from the coordinated cluster of TRPs 105, communicate with the UE 115 via one or more of the TRPs 105 from the second coordinated cluster of TRPs 105, and communicate with the second UE 115 via one or more of the TRPs 105 from the coordinated cluster of TRPs 105.

Transmitter 1520 may transmit signals generated by other components of the device 1505. In some examples, the transmitter 1520 may be collocated with a receiver 1510 in a transceiver module. For example, the transmitter 1520 may be an example of aspects of the transceiver 1735 described with reference to FIG. 17. The transmitter 1520 may utilize a single antenna or a set of antennas.

Figure 16:
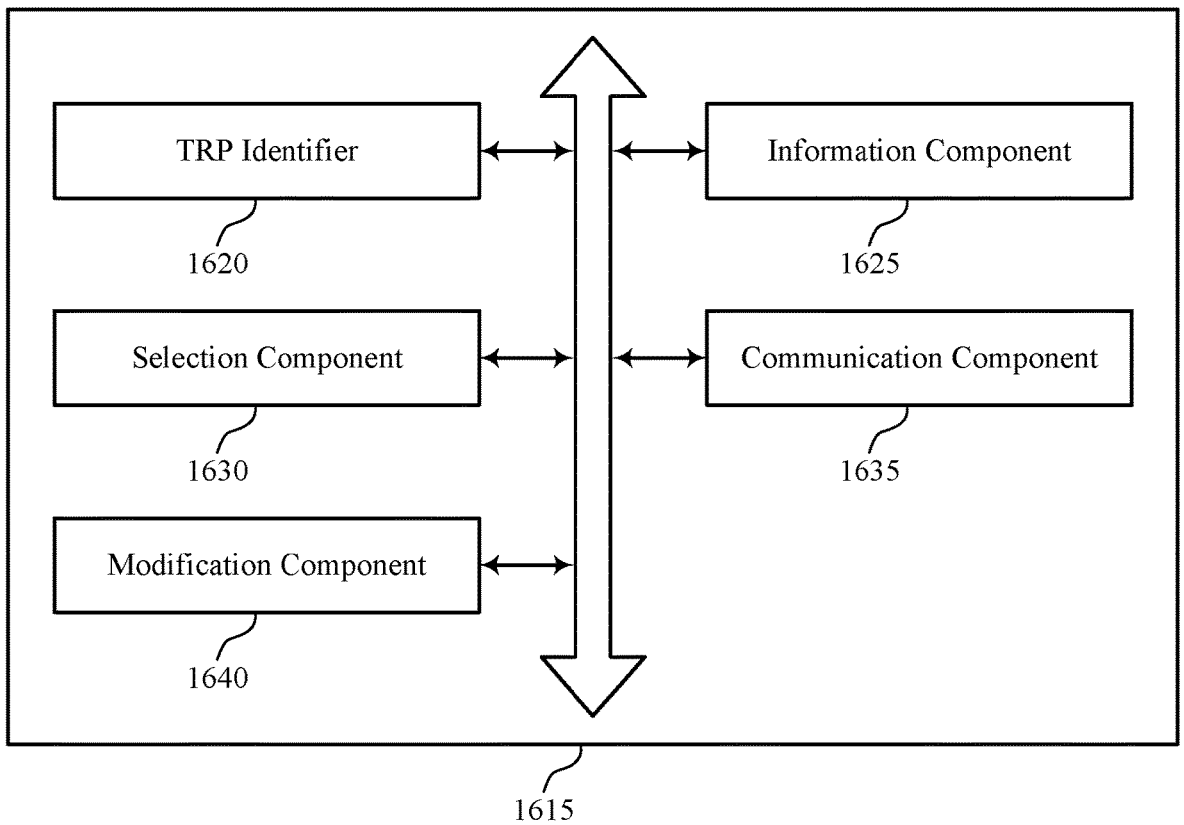

FIG. 16 shows a block diagram 1600 of a wireless device communications manager 1615 that supports mobile device centric clustering in wireless systems in accordance with aspects of the present disclosure. The wireless device communications manager 1615 may be an example of aspects of a wireless device communications manager 1715 described with reference to FIGS. 14, 15, and 17. The wireless device communications manager 1615 may include TRP identifier 1620, information component 1625, selection component 1630, communication component 1635, and modification component 1640. Each of these modules may communicate, directly or indirectly, with one another (e.g., via one or more buses).

TRP identifier 1620 may identify a group of TRPs 105 accessible by a UE 115 in a coordinated wireless system.

Information component 1625 may receive information associated with signal measurements between the UE 115 and the group of TRPs 105, receive additional information associated with signal measurements between the UE 115 and the group of TRPs 105, and receive additional information associated with signal measurements between a second UE 115 and the group of TRPs 105.

Selection component 1630 may dynamically select a coordinated cluster of TRPs 105 from the group of TRPs 105 for communication with the UE 115 based on the signal measurements, dynamically select a second coordinated cluster of TRPs 105 from the group of TRPs 105 for communication with the UE 115 based on the signal measurements, where the second coordinated cluster includes at least one TRP 105 different from TRPs 105 of the coordinated cluster, and dynamically select the coordinated cluster of TRPs 105 from the group of TRPs 105 for communication with the second UE 115 based on the signal measurements. In some cases, the coordinated cluster of TRPs 105 is dynamically selected based on preferences associated with the UE 115, preferences associated with at least one other UE 115, environmental conditions, capabilities of the UE 115 or a second UE 115 in communication with the coordinated cluster, or a combination thereof.

Communication component 1635 may communicate with the UE 115 via one or more of the TRPs 105 from the coordinated cluster of TRPs 105, communicate with the UE 115 via one or more of the TRPs 105 from the second coordinated cluster of TRPs 105, and communicate with the second UE 115 via one or more of the TRPs 105 from the coordinated cluster of TRPs 105.

Modification component 1640 may modify a set of TRPs 105 of the coordinated cluster based on the additional information. In some cases, modifying the set of TRPs 105 includes: adding at least one additional TRP 105, removing a TRP 105 of the set of TRPs 105, or a combination thereof.

Figure 17:
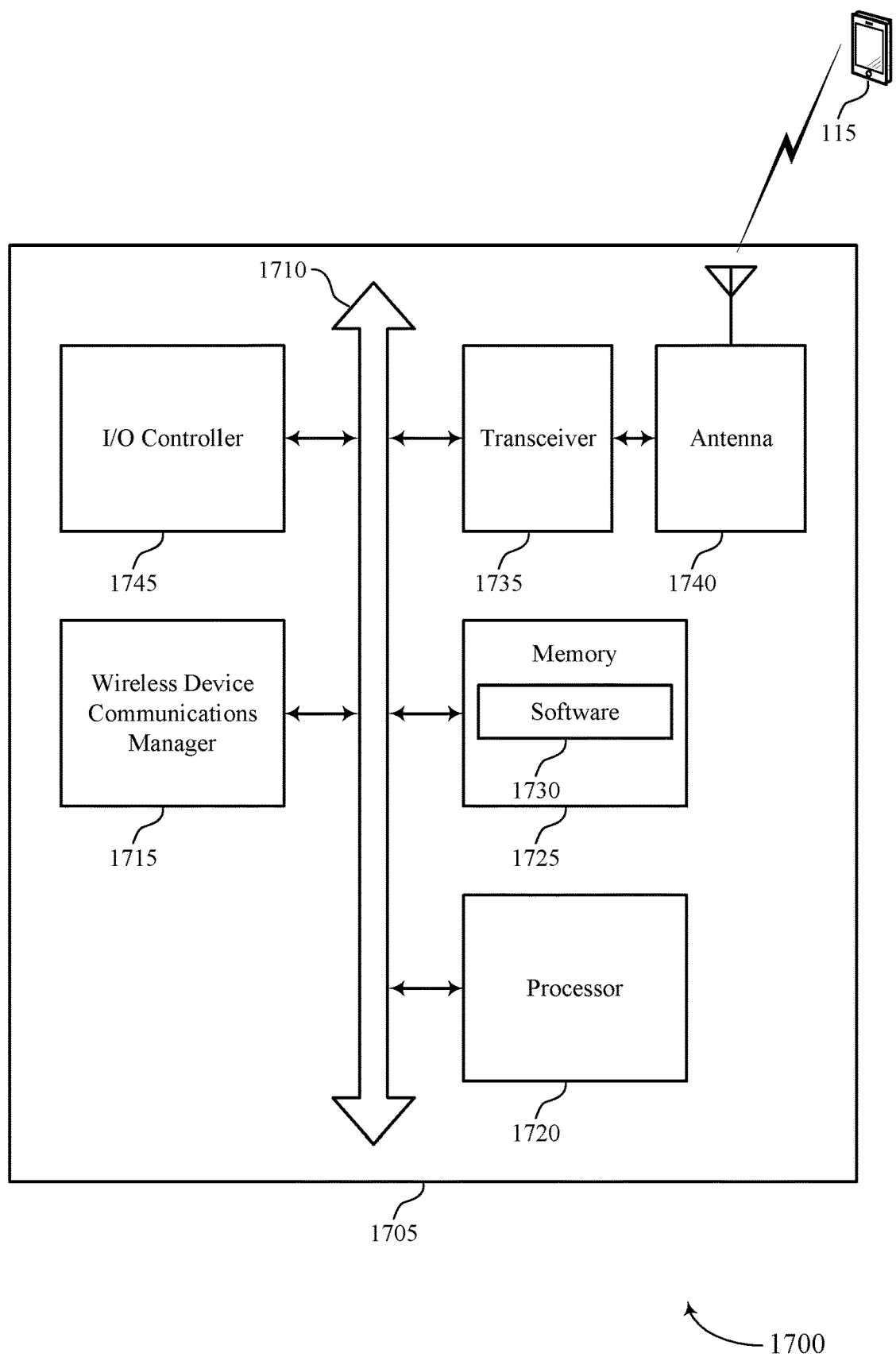
FIG. 17 illustrates a block diagram of a system including a wireless device that supports mobile device centric clustering in wireless systems in accordance with aspects of the present disclosure.

FIG. 17 shows a diagram of a system 1700 including a device 1705 that supports mobile device centric clustering in wireless systems in accordance with aspects of the present disclosure. Device 1705 may be an example of or include the components of wireless device such as a base station 105, a TRP 105, or a core network node 205 as described above, e.g., with reference to FIG. 1. Device 1705 may include components for bi-directional voice and data communications including components for transmitting and receiving communications, including wireless device communications manager 1715, processor 1720, memory 1725, software 1730, transceiver 1735, antenna 1740, and I/O controller 1745. These components may be in electronic communication via one or more buses (e.g., bus 1710).

Processor 1720 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1720 may be configured to operate a memory array using a memory controller. In other cases, a memory controller may be integrated into processor 1720. Processor 1720 may be configured to execute computer-readable instructions stored in a memory to perform various functions (e.g., functions or tasks supporting mobile device centric clustering in wireless systems).

Memory 1725 may include RAM and ROM. The memory 1725 may store computer-readable, computer-executable software 1730 including instructions that, when executed, cause the processor to perform various functions described herein. In some cases, the memory 1725 may contain, among other things, a BIOS which may control basic hardware or software operation such as the interaction with peripheral components or devices.

Software 1730 may include code to implement aspects of the present disclosure, including code to support mobile device centric clustering in wireless systems. Software 1730 may be stored in a non-transitory computer-readable medium such as system memory or other memory. In some cases, the software 1730 may not be directly executable by the processor but may cause a computer (e.g., when compiled and executed) to perform functions described herein.

Transceiver 1735 may communicate bi-directionally, via one or more antennas, wired, or wireless links as described above. For example, the transceiver 1735 may represent a wireless transceiver and may communicate bi-directionally with another wireless transceiver. The transceiver 1735 may also include a modem to modulate the packets and provide the modulated packets to the antennas for transmission, and to demodulate packets received from the antennas.

In some cases, the wireless device 1705 may include a single antenna 1740. However, in some cases the device 1705 may have more than one antenna 1740, which may be capable of concurrently transmitting or receiving multiple wireless transmissions.

I/O controller 1745 may manage input and output signals for device 1705. I/O controller 1745 may also manage peripherals not integrated into device 1705. In some cases, I/O controller 1745 may represent a physical connection or port to an external peripheral. In some cases, I/O controller 1745 may utilize an operating system such as iOS®, ANDROID®, MS-DOS®, MS-WINDOWS®, OS/2®, UNIX®, LINUX®, or another known operating system. In other cases, I/O controller 1745 may represent or interact with a modem, a keyboard, a mouse, a touchscreen, or a similar device. In some cases, I/O controller 1745 may be implemented as part of a processor. In some cases, a user may interact with device 1705 via I/O controller 1745 or via hardware components controlled by I/O controller 1745.

Figure 18:
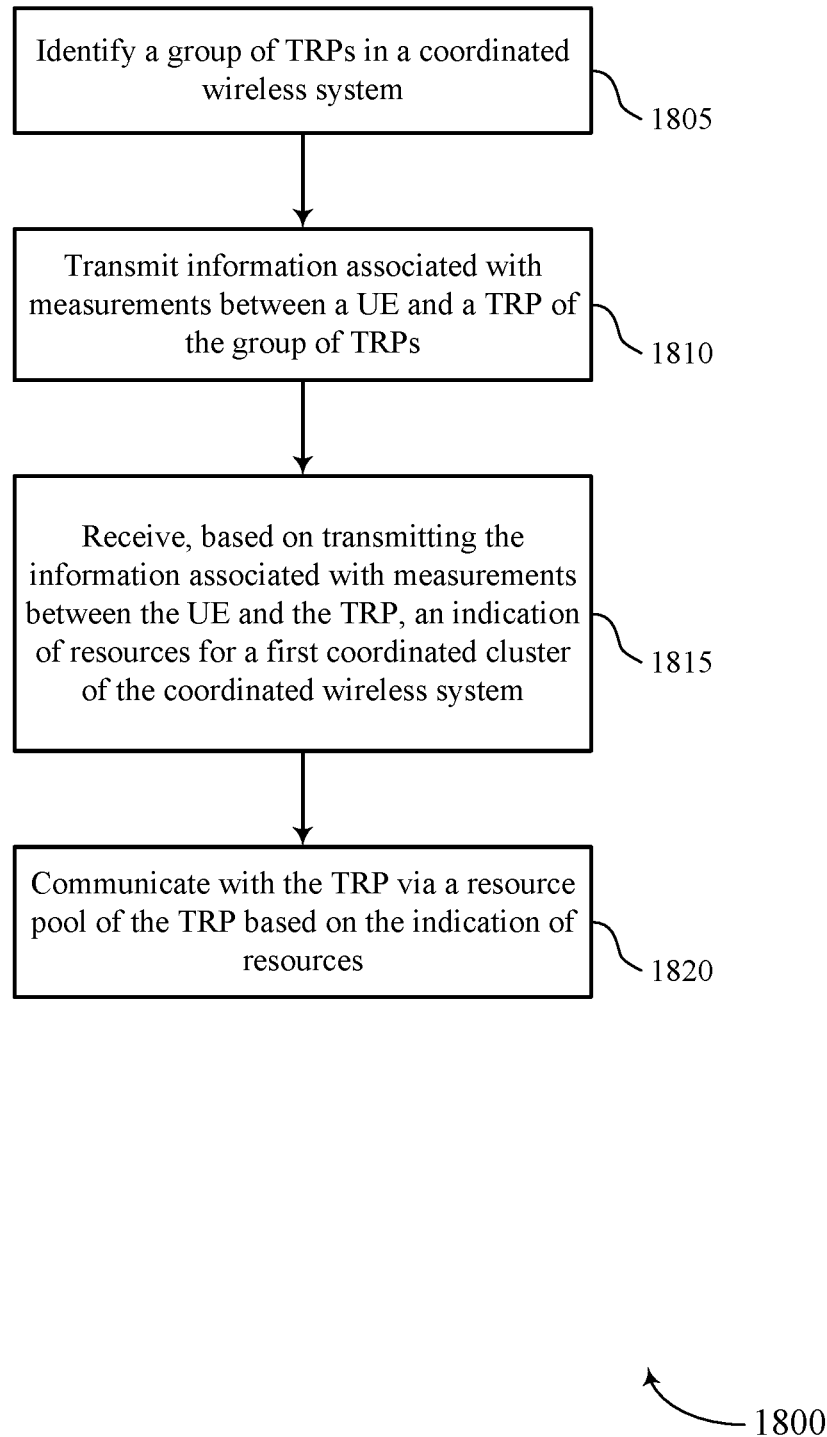
FIGS. 18 through 22 illustrate methods for mobile device centric clustering in wireless systems in accordance with aspects of the present disclosure.

FIG. 18 shows a flowchart illustrating a method 1800 for mobile device centric clustering in wireless systems in accordance with aspects of the present disclosure. The operations of method 1800 may be implemented by a UE 115 or its components as described herein. For example, the operations of method 1800 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1805, the UE 115 may identify a group of TRPs 105 in a coordinated wireless system. The operations of 1805 may be performed according to the methods described herein. In certain examples, aspects of the operations of 1805 may be performed by a coordinated identifier as described with reference to FIGS. 6 through 9.

At 1810, the UE 115 may transmit information associated with measurements between a UE 115 and a TRP 105 of the group of TRPs 105. The operations of 1810 may be performed according to the methods described herein. In certain examples, aspects of the operations of 1810 may be performed by an information transmitter as described with reference to FIGS. 6 through 9.

At 1815, the UE 115 may receive, based at least in part on transmitting the information associated with measurements between the UE 115 and the TRP 105, an indication of resources for a first coordinated cluster of the coordinated wireless system. The operations of 1815 may be performed according to the methods described herein. In certain examples, aspects of the operations of 1815 may be performed by an indication receiver as described with reference to FIGS. 6 through 9.

At 1820, the UE 115 may communicate with the TRP 105 via a resource pool of the TRP 105 based at least in part on the indication of resources. The operations of 1820 may be performed according to the methods described herein. In certain examples, aspects of the operations of 1820 may be performed by a communication component as described with reference to FIGS. 6 through 9.

Figure 19:
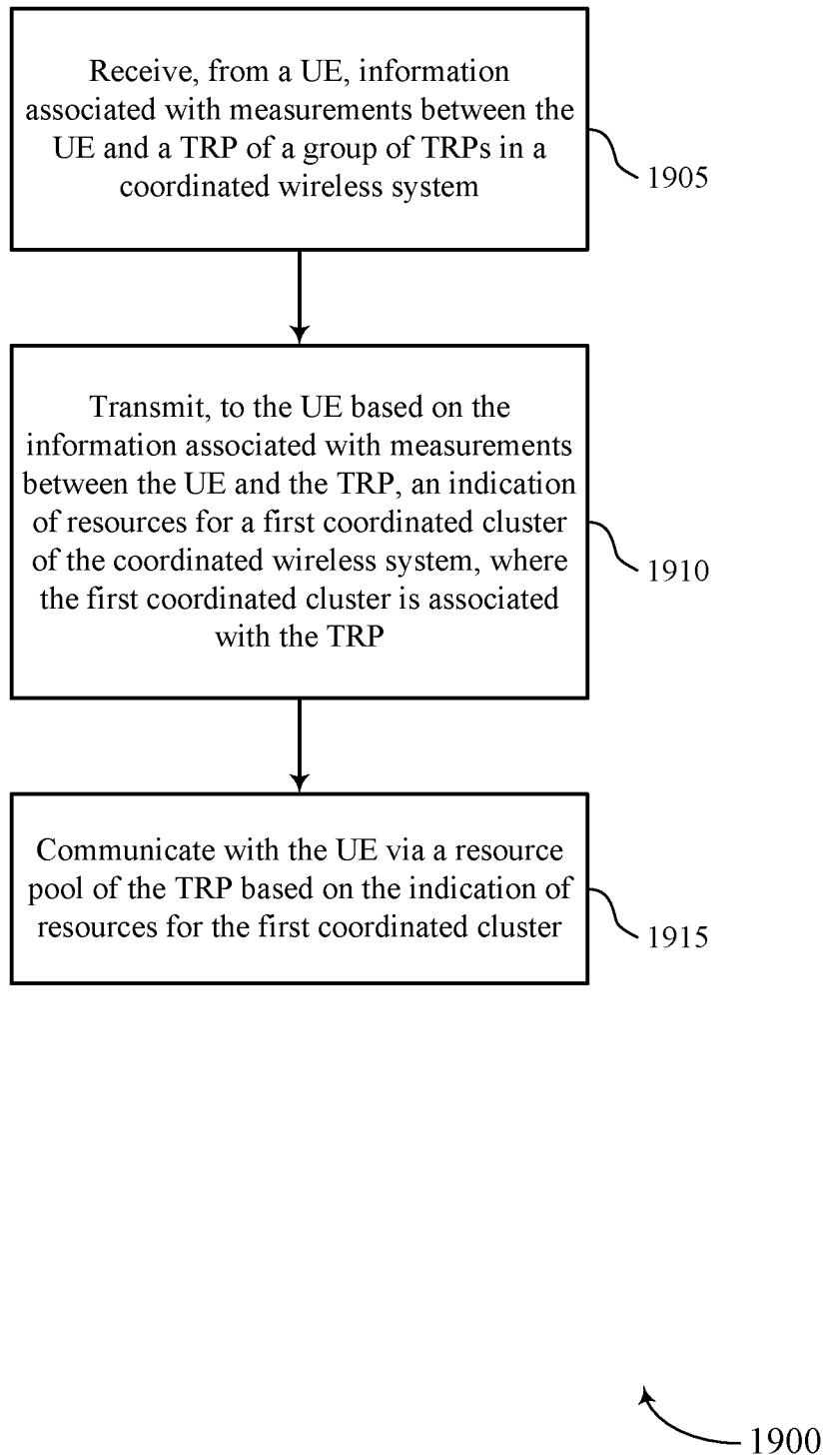

FIG. 19 shows a flowchart illustrating a method 1900 for mobile device centric clustering in wireless systems in accordance with aspects of the present disclosure. The operations of method 1900 may be implemented by a base station 105 or its components as described herein. For example, the operations of method 1900 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1905, the base station 105 may receive, from a UE 115, information associated with measurements between the UE 115 and a TRP 105 of a group of TRPs 105 in a coordinated wireless system. The operations of 1905 may be performed according to the methods described herein. In certain examples, aspects of the operations of 1905 may be performed by an information receiver as described with reference to FIGS. 10 through 13.

At 1910, the base station 105 may transmit, to the UE 115 based at least in part on the information associated with measurements between the UE 115 and the TRP 105, an indication of resources for a first coordinated cluster of the coordinated wireless system, where the first coordinated cluster is associated with the TRP 105. The operations of 1910 may be performed according to the methods described herein. In certain examples, aspects of the operations of 1910 may be performed by an indication transmitter as described with reference to FIGS. 10 through 13.

At 1915, the base station 105 may communicate with the UE 115 via a resource pool of the TRP 105 based at least in part on the indication of resources for the first coordinated cluster. The operations of 1915 may be performed according to the methods described herein. In certain examples, aspects of the operations of 1915 may be performed by a communication component as described with reference to FIGS. 10 through 13.

Figure 20:
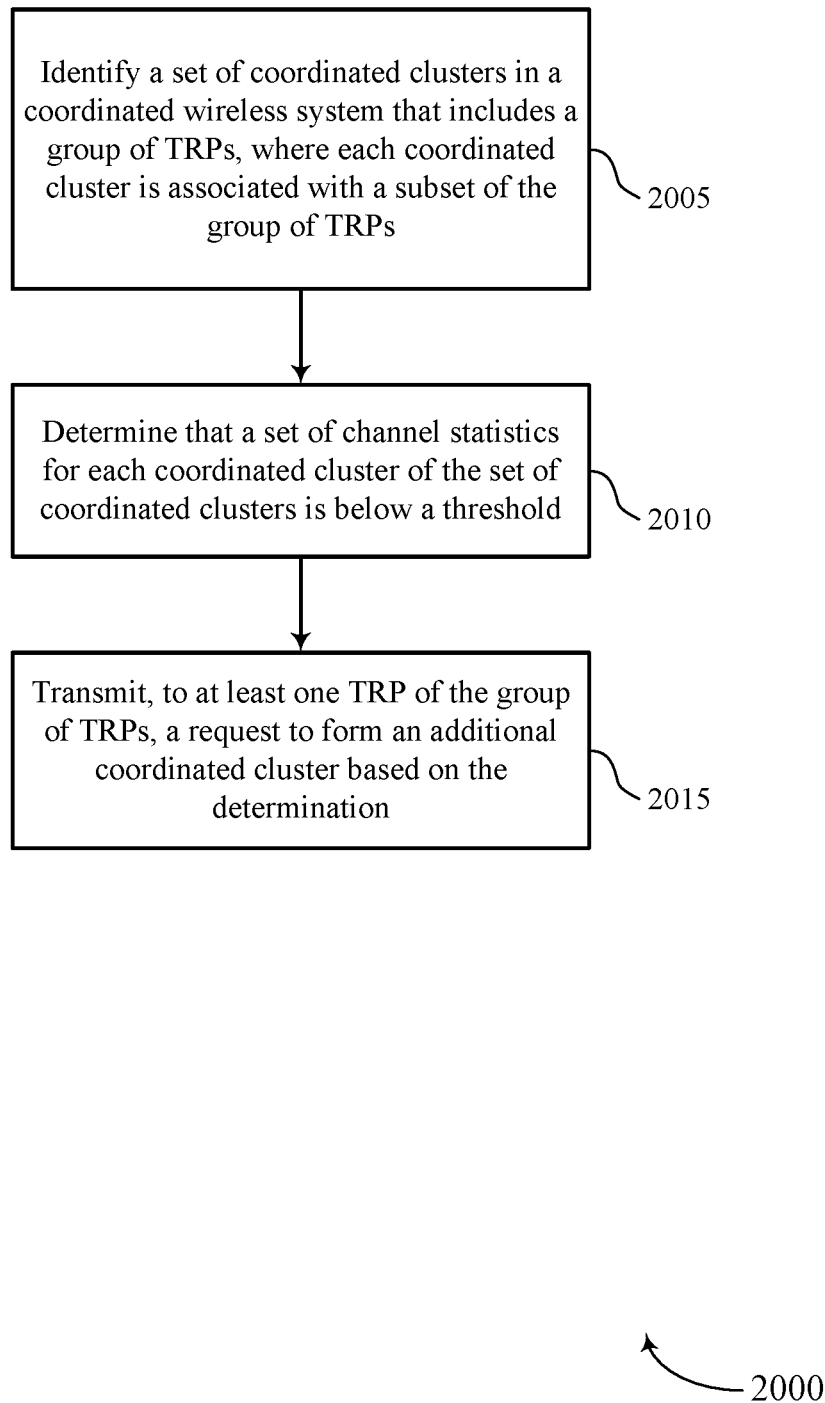

FIG. 20 shows a flowchart illustrating a method 2000 for mobile device centric clustering in wireless systems in accordance with aspects of the present disclosure. The operations of method 2000 may be implemented by a UE 115 or its components as described herein. For example, the operations of method 2000 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 2005, the UE 115 may identify a set of coordinated clusters in a coordinated wireless system that may include a group of TRPs 105, where each coordinated cluster is associated with a subset of the group of TRPs 105. The operations of 2005 may be performed according to the methods described herein. In certain examples, aspects of the operations of 2005 may be performed by a coordinated identifier as described with reference to FIGS. 6 through 9.

At 2010, the UE 115 may determine that a set of channel statistics for each coordinated cluster of the set of coordinated clusters is below a threshold. The operations of 2010 may be performed according to the methods described herein. In certain examples, aspects of the operations of 2010 may be performed by a statistic component as described with reference to FIGS. 6 through 9.

At 2015, the UE 115 may transmit, to at least one TRP 105 of the group of TRPs 105, a request to form an additional coordinated cluster based at least in part on the determination. The operations of 2015 may be performed according to the methods described herein. In certain examples, aspects of the operations of 2015 may be performed by a request transmitter as described with reference to FIGS. 6 through 9.

Figure 21:
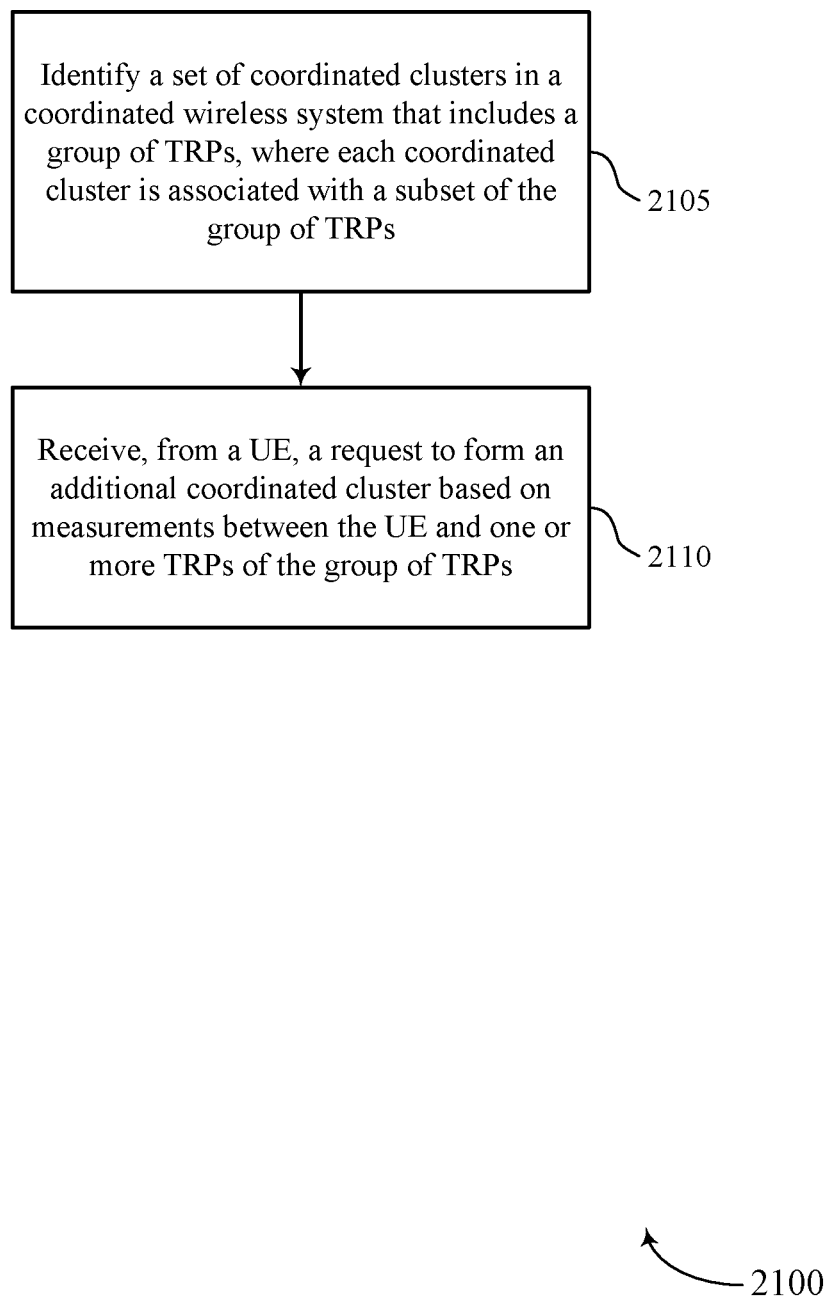

FIG. 21 shows a flowchart illustrating a method 2100 for mobile device centric clustering in wireless systems in accordance with aspects of the present disclosure. The operations of method 2100 may be implemented by a base station 105, a TRP 105, a core network node 205 or their components as described herein. For example, the operations of method 2100 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 2105, the base station 105 may identify a set of coordinated clusters in a coordinated wireless system that may include a group of TRPs 105, where each coordinated cluster is associated with a subset of the group of TRPs 105. The operations of 2105 may be performed according to the methods described herein. In certain examples, aspects of the operations of 2105 may be performed by a coordinated identifier as described with reference to FIGS. 10 through 13.

At 2110, the base station 105 may receive, from a UE 115, a request to form an additional coordinated cluster based at least in part on measurements between the UE 115 and one or more TRPs 105 of the group of TRPs 105. The operations of 2110 may be performed according to the methods described herein. In certain examples, aspects of the operations of 2110 may be performed by a request receiver as described with reference to FIGS. 10 through 13.

Figure 22:
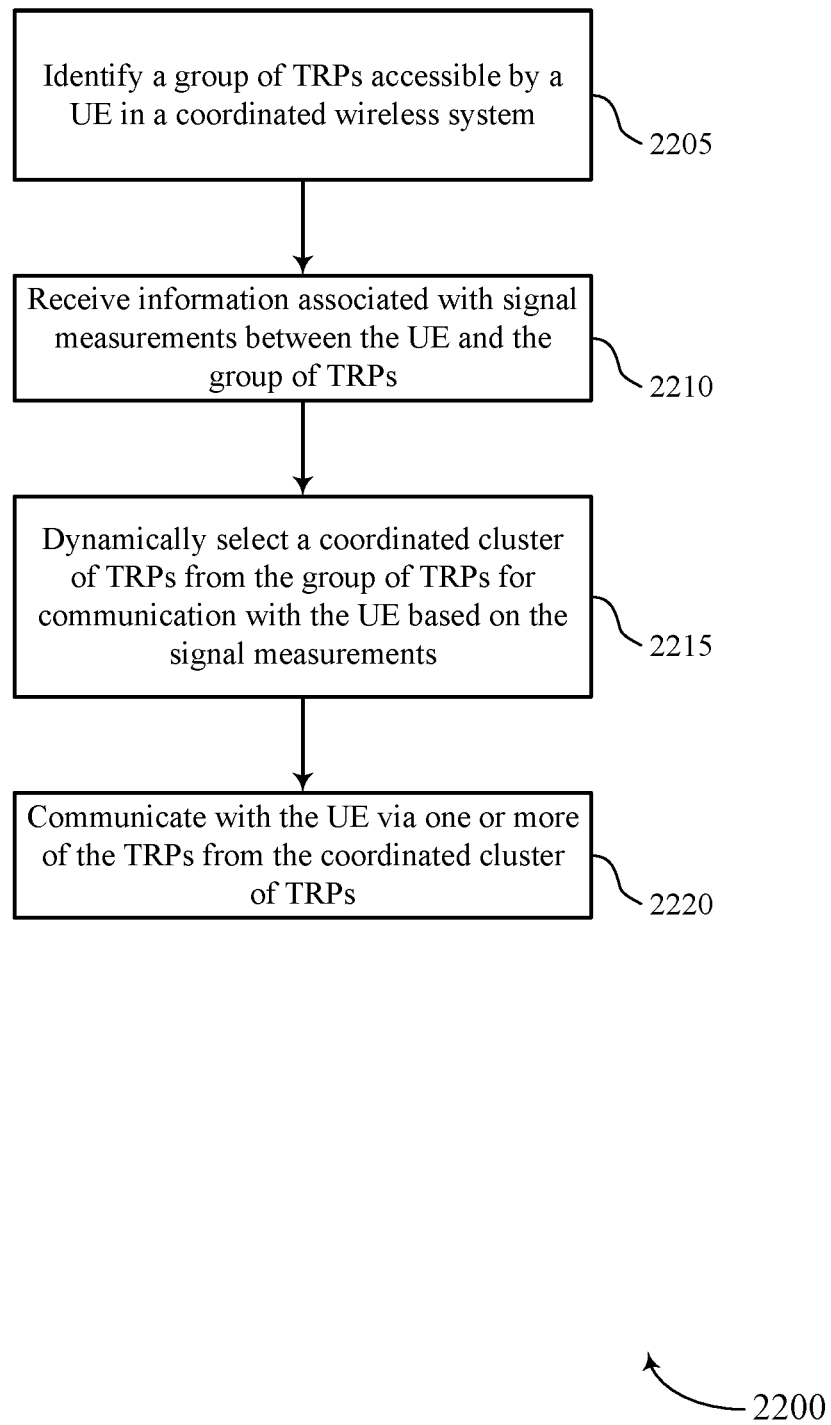

FIG. 22 shows a flowchart illustrating a method 2200 for mobile device centric clustering in wireless systems in accordance with aspects of the present disclosure. The operations of method 2200 may be implemented by a wireless device such as a base station 105, a TRP 105, or a core network node 205 or its components as described herein. For example, the operations of method 2200 may be performed by a wireless device communications manager as described with reference to FIGS. 14 through 17. In some examples, a wireless device such as a base station 105, a TRP 105, or a core network node 205 may execute a set of codes to control the functional elements of the device to perform the functions described below. Additionally or alternatively, the wireless device such as a base station, a TRP 105, or a core network node 205 may perform aspects of the functions described below using special-purpose hardware.

At 2205, the wireless device may identify a group of TRPs 105 accessible by a UE 115 in a coordinated wireless system. The operations of 2205 may be performed according to the methods described herein. In certain examples, aspects of the operations of 2205 may be performed by a TRP identifier as described with reference to FIGS. 14 through 17.

At 2210, the wireless device may receive information associated with signal measurements between the UE 115 and the group of TRPs 105. The operations of 2210 may be performed according to the methods described herein. In certain examples, aspects of the operations of 2210 may be performed by an information component as described with reference to FIGS. 14 through 17.

At 2215, the wireless device may dynamically select a coordinated cluster of TRPs 105 from the group of TRPs 105 for communication with the UE 115 based at least in part on the signal measurements. The operations of 2215 may be performed according to the methods described herein. In certain examples, aspects of the operations of 2215 may be performed by a selection component as described with reference to FIGS. 14 through 17.

At 2220, the wireless device may communicate with the UE 115 via one or more of the TRPs 105 from the coordinated cluster of TRPs 105. The operations of 2220 may be performed according to the methods described herein. In certain examples, aspects of the operations of 2220 may be performed by a communication component as described with reference to FIGS. 14 through 17.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA.

A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
    identifying a group of transmission reception points (TRPs) in a coordinated wireless system;
    transmitting, to a TRP of the group of TRPs, information associated with measurements between the UE and the TRP by transmitting a reference signal on dedicated resources for each resource pool associated with the group of TRPs;
    receiving, from the TRP based at least in part on transmitting the information associated with measurements between the UE and the TRP, an indication of resources for a first coordinated cluster of the coordinated wireless system; and
    communicating with the TRP via a resource pool of the TRP based at least in part on the indication of resources.

2. The method of claim 1, further comprising:
    receiving a downlink message via dedicated resources for the resource pool of the TRP based at least in part on the transmitted reference signal.

3. The method of claim 2, wherein the downlink message is received from the TRP or a core network node.

4. The method of claim 1, further comprising:
    receiving a downlink message via dedicated resources for a second resource pool of a second TRP of the group of TRPs based at least in part on the transmitted reference signal; and
    communicating with the second TRP via the second resource pool.

5. The method of claim 4, wherein the resource pool and the second resource pool are the same.

6. The method of claim 1, wherein transmitting the reference signal on dedicated resources comprises:
    transmitting the reference signal to the TRP.

7. The method of claim 1, further comprising:
    receiving, based at least in part on transmitting the information associated with measurements between the UE and the TRP, an indication of one or more TRP identifiers (IDs) for TRPs of the first coordinated cluster, wherein communication with the TRP is based at least in part on the indication of one or more TRP IDs.

8. The method of claim 1, further comprising:
    receiving a broadcast signal from the TRP; and
    measuring a signal quality parameter of the broadcast signal, wherein the information associated with measurements between the UE and the TRP comprises a measurement report that includes the signal quality parameter.

9. The method of claim 8, further comprising:
    receiving a downlink message via dedicated resources for the resource pool of the TRP based at least in part on the measurement report, wherein the downlink message is received from the TRP or a core network node.

10. The method of claim 8, further comprising:
    receiving a downlink message via dedicated resources for a second resource pool of a second TRP of the group of TRPs based at least in part on the measurement report; and
    communicating with the second TRP via the second resource pool, wherein the resource pool and the second resource pool are the same.

11. The method of claim 8, wherein the measurement report is transmitted to multiple TRPs including the TRP or a core network node in communication with multiple TRPs including the TRP.

12. The method of claim 1, wherein communicating with the TRP comprises:
    monitoring a set of control channel resources associated with the resource pool of the TRP based at least in part on the indication of resources, the method further comprising:
    decoding at least one control channel message from the TRP based at least in part on the monitoring.

13. The method of claim 1, further comprising:
    performing handover from the first coordinated cluster to a second coordinated cluster based at least in part on measurements between the UE and an additional TRP of the group of TRPs, wherein the second coordinated cluster comprises the TRP and the additional TRP or wherein the second coordinated cluster comprises the additional TRP and excludes the TRP.

14. A method for wireless communications, comprising:
    receiving, from a user equipment (UE), information associated with measurements between the UE and a transmission reception point (TRP) of a group of TRPs in a coordinated wireless system;
    transmitting, to the UE based at least in part on the information associated with measurements between the UE and the TRP, an indication of resources for a first coordinated cluster of the coordinated wireless system, wherein the first coordinated cluster is associated with the TRP;
    receiving, from a core network node, a backhaul message that indicates resources for the first coordinated cluster, wherein transmitting the indication of resources comprises transmitting, to the UE, a downlink message via dedicated resources for the resource pool of the TRP; and
    communicating with the UE via a resource pool of the TRP based at least in part on the indication of resources for the first coordinated cluster.

15. The method of claim 14, wherein receiving information associated with measurements between the UE and the TRP comprises:
receiving, from the UE, a reference signal for measurement by the TRP.

16. The method of claim 15, further comprising:
measuring a signal quality parameter of the reference signal received from the UE;
transmitting, to a core network node, a measurement report that comprises the signal quality parameter; and
receiving, from the core network node, a backhaul message that indicates resources for the first coordinated cluster based at least in part on the measurement report.

17. The method of claim 14, further comprising:
transmitting a broadcast signal to the UE, wherein the information associated with measurements between the UE and the TRP comprises a measurement report based at least in part on the broadcast signal.

18. The method of claim 17, further comprising:
transmitting the measurement report to a core network node; and
receiving, from the core network node, a backhaul message that indicates resources for the first coordinated cluster based at least in part on the measurement report.

19. A method for wireless communications, comprising:
identifying a set of coordinated clusters in a coordinated wireless system that comprises a group of transmission reception points (TRPs), wherein each coordinated cluster is associated with a subset of the group of TRPs;
determining that a set of channel statistics for each coordinated cluster of the set of coordinated clusters is below a threshold; and
transmitting, to at least one TRP of the group of TRPs, a request to form an additional coordinated cluster based at least in part on the determination.

20. The method of claim 19, further comprising:
receiving an indication that the additional coordinated cluster has been formed based at least in part on the request, wherein the additional coordinated cluster is associated with multiple TRPs of the group of TRPs.

21. The method of claim 19, further comprising:
performing channel statistic measurements for one or more clusters of the set of coordinated clusters, wherein the set of channel statistics for each coordinated cluster of the set of coordinated clusters is determined to be below the threshold based at least in part on the channel statistic measurements.

22. The method of claim 19, further comprising:
performing handover from a first coordinated cluster of the set of coordinated clusters to the additional coordinated cluster based at least in part on the request to form the additional coordinated cluster.

23. The method of claim 19, further comprising:
measuring channel statistics for a first coordinated cluster of the set of coordinated clusters; and
performing handover from the additional coordinated cluster to the first coordinated cluster based at least in part on the measured channel statistics.

24. A method for wireless communications, comprising:
identifying a set of coordinated clusters in a coordinated wireless system that comprises a group of transmission reception points (TRPs), wherein each coordinated cluster is associated with a subset of the group of TRPs;
receiving, from a user equipment (UE), a request to form an additional coordinated cluster based at least in part on measurements between the UE and one or more TRPs of the group of TRPs;
transmitting, to a core network node, the request to form the additional coordinated cluster;
receiving, from the core network node, an indication that the additional coordinated cluster has been formed based at least in part on the request; and
transmitting, to the UE, the indication that the additional coordinated cluster has been formed.

25. The method of claim 24, further comprising:
receiving, from the UE, a handover request to perform handover from the additional coordinated cluster to a first coordinated cluster of the group of TRPs.

26. The method of claim 24, further comprising:
receiving, from the UE, a handover request to perform handover from a first coordinated cluster of the group of TRPs to the additional coordinated cluster.

27. The method of claim 24, further comprising:
receiving, from a second UE, a join request to join a cluster of the coordinated system; and
transmitting, to the second UE, an indication to join the additional coordinated cluster.

* * * * *